US012671978B2

(12) United States Patent
Wendeborn et al.

(10) Patent No.: US 12,671,978 B2
(45) Date of Patent: Jun. 30, 2026

(54) INTELLIGENT INITIAL PROVISIONING FOR USER EQUIPMENT WITH ONE OR MORE SUBSCRIBER IDENTITY MODULES

(71) Applicant: Boost SubscriberCo L.L.C., Englewood, CO (US)

(72) Inventors: Jeffrey Wendeborn, Highlands Ranch, CO (US); Pavan Nori, Parker, CO (US); Julian Bishop, Elizabeth, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 246 days.

(21) Appl. No.: 18/416,445

(22) Filed: Jan. 18, 2024

(65) Prior Publication Data

US 2024/0244417 A1      Jul. 18, 2024

Related U.S. Application Data

(60) Provisional application No. 63/439,816, filed on Jan. 18, 2023.

(51) Int. Cl.
| | |
|---|---|
| *H04W 8/20* | (2009.01) |
| *H04W 8/04* | (2009.01) |
| *H04W 24/02* | (2009.01) |

(52) U.S. Cl.
CPC .............. *H04W 8/20* (2013.01); *H04W 8/04* (2013.01); *H04W 24/02* (2013.01)

(58) Field of Classification Search
CPC .......... H04W 8/20; H04W 8/04; H04W 24/02
See application file for complete search history.

(56) References Cited

U.S. PATENT DOCUMENTS

| | | | |
|---|---|---|---|
| 6,832,089 | B2 | 12/2004 | Jean Henry-Labordere |
| 7,631,331 | B2 | 12/2009 | Sie et al. |
| | | (Continued) | |

FOREIGN PATENT DOCUMENTS

| | | |
|---|---|---|
| CN | 102143474 | 8/2011 |
| CN | 111970686 A | 11/2020 |
| | (Continued) | |

OTHER PUBLICATIONS

Bei et al., "Network Switch Systems and Methods," U.S. Appl. No. 18/812,899, filed Aug. 22, 2024.

(Continued)

*Primary Examiner* — Curtis B Odom
(74) *Attorney, Agent, or Firm* — Jeremiah J. Baunach; Frontier IP Law PLLC

(57) ABSTRACT

Intelligent initial provisioning for UE with one or more than one subscriber identity modules (SIMs) is disclosed. Intelligent initial provisioning is the selection and provisioning of subscribers on a network from among multiple mobile network operator (MNO) networks using a respective SIM. In other words, intelligent initial provisioning pertains to selecting the home network of the UE. The intelligent initial provisioning may take into account criteria such as the home location of the UE, the capabilities of the UE, phone number eligibility, the average signal strength of the MNO networks in the area, the typical congestion on the MNO networks, the number or percentage of subscribers of the initial provisioning entity that are on the MNO networks, cost criteria, subscription criteria, MNO contract criteria, highest service quality, lowest voice and SMS service cost, etc. Forecasts of future traffic on the MNO networks may also factor into the intelligent initial provisioning.

20 Claims, 17 Drawing Sheets

(56) References Cited

U.S. PATENT DOCUMENTS

| | | | |
|---|---|---|---|
| 8,516,119 | B2 | 8/2013 | Banger et al. |
| 9,661,380 | B2 | 5/2017 | Major et al. |
| 9,763,093 | B2 | 9/2017 | Richards et al. |
| 9,848,249 | B2 | 12/2017 | Freed et al. |
| 10,171,514 | B2 | 1/2019 | Ramachandran et al. |
| 10,334,428 | B1 | 6/2019 | Chen et al. |
| 10,638,310 | B2 | 4/2020 | Subramaniam |
| 10,645,196 | B1 | 5/2020 | Sharipov et al. |
| 10,708,759 | B1 | 7/2020 | Roy et al. |
| 10,945,048 | B2 | 3/2021 | Major et al. |
| 11,172,269 | B2 | 11/2021 | Major |
| 11,178,469 | B2 | 11/2021 | Major |
| 11,533,611 | B2 | 12/2022 | Berard et al. |
| 11,641,579 | B1 | 5/2023 | Mukherjee et al. |
| 2002/0177438 | A1 | 11/2002 | Sakai et al. |
| 2005/0192035 | A1 | 9/2005 | Jiang |
| 2007/0155382 | A1 | 7/2007 | Jiang |
| 2007/0191011 | A1 | 8/2007 | Jiang |
| 2007/0203880 | A1 | 8/2007 | Kumar et al. |
| 2008/0085707 | A1 | 4/2008 | Fadell |
| 2008/0132226 | A1 | 6/2008 | Carnall |
| 2008/0167853 | A1 | 7/2008 | Fernsler et al. |
| 2008/0216157 | A1 | 9/2008 | Huuhtanen et al. |
| 2009/0077580 | A1 | 3/2009 | Konig et al. |
| 2009/0086726 | A1 | 4/2009 | Savage et al. |
| 2009/0191857 | A1 | 7/2009 | Horn et al. |
| 2009/0304358 | A1 | 12/2009 | Rashkovskiy et al. |
| 2010/0017861 | A1 | 1/2010 | Krishnaswamy et al. |
| 2011/0194838 | A1 | 8/2011 | Meijer |
| 2011/0197224 | A1 | 8/2011 | Meijer |
| 2012/0147824 | A1 | 6/2012 | Van et al. |
| 2012/0185561 | A1 | 7/2012 | Klein et al. |
| 2013/0072257 | A1 | 3/2013 | Evans et al. |
| 2013/0139235 | A1 | 5/2013 | Counterman |
| 2013/0262404 | A1 | 10/2013 | Daga et al. |
| 2013/0336210 | A1 | 12/2013 | Connor et al. |
| 2014/0051417 | A1 | 2/2014 | Wuerch et al. |
| 2014/0273944 | A1 | 9/2014 | Ramprasad |
| 2014/0342776 | A1 | 11/2014 | Viswanadham et al. |
| 2015/0189615 | A1 | 7/2015 | Rembarz et al. |
| 2015/0334646 | A1* | 11/2015 | Buckley .............. H04W 48/18 |
| | | | 455/432.1 |
| 2015/0349824 | A1 | 12/2015 | Cho et al. |
| 2016/0149605 | A1 | 5/2016 | Vecera et al. |
| 2016/0306965 | A1 | 10/2016 | Iyer et al. |
| 2016/0323193 | A1 | 11/2016 | Zhou et al. |
| 2017/0048566 | A1 | 2/2017 | Srinivasan |
| 2017/0048773 | A1 | 2/2017 | Miao et al. |
| 2017/0201876 | A1 | 7/2017 | Tamagawa |
| 2017/0208369 | A1 | 7/2017 | Major et al. |
| 2017/0223598 | A1 | 8/2017 | Ho et al. |
| 2017/0264951 | A1 | 9/2017 | Mitra et al. |
| 2018/0084504 | A1 | 3/2018 | Lindoff et al. |
| 2018/0167853 | A1 | 6/2018 | Wang |
| 2018/0189276 | A1 | 7/2018 | Fonseca, Jr. et al. |
| 2018/0331974 | A1 | 11/2018 | He et al. |
| 2018/0359540 | A1 | 12/2018 | Major |
| 2019/0007082 | A1 | 1/2019 | Dumoulin et al. |
| 2019/0200065 | A1 | 6/2019 | Haberman et al. |
| 2019/0253836 | A1 | 8/2019 | Sinha et al. |
| 2019/0313135 | A1 | 10/2019 | Pathak et al. |
| 2020/0084614 | A1 | 3/2020 | Xu |
| 2020/0100097 | A1 | 3/2020 | Zheng et al. |
| 2020/0213673 | A1 | 7/2020 | Major et al. |
| 2021/0112382 | A1 | 4/2021 | Oswal et al. |
| 2021/0195392 | A1 | 6/2021 | Kojima et al. |
| 2021/0203719 | A1 | 7/2021 | Miyagi |
| 2021/0250430 | A1 | 8/2021 | Moon |
| 2021/0297941 | A1 | 9/2021 | Brown et al. |
| 2022/0022014 | A1 | 1/2022 | Li et al. |
| 2022/0053607 | A1 | 2/2022 | Rice et al. |
| 2022/0086532 | A1 | 3/2022 | Major |
| 2022/0150686 | A1 | 5/2022 | Nitsch |
| 2022/0286839 | A1 | 9/2022 | Zhao et al. |
| 2022/0295343 | A1 | 9/2022 | Pefkianakis et al. |
| 2022/0368441 | A1 | 11/2022 | Lee |
| 2022/0369094 | A1 | 11/2022 | Rajwar et al. |
| 2023/0084923 | A1 | 3/2023 | Hieb et al. |
| 2023/0107904 | A1 | 4/2023 | Wang et al. |
| 2023/0396979 | A1 | 12/2023 | Kanchiraju et al. |
| 2024/0040497 | A1 | 2/2024 | Ohno |
| 2024/0073674 | A1 | 2/2024 | Chughtai et al. |
| 2024/0098504 | A1 | 3/2024 | Demonget et al. |
| 2024/0147215 | A1 | 5/2024 | Kim et al. |
| 2024/0147216 | A1 | 5/2024 | Kim et al. |
| 2024/0188067 | A1 | 6/2024 | Zhang et al. |
| 2024/0204978 | A1 | 6/2024 | Eldar et al. |
| 2024/0224020 | A1 | 7/2024 | Haswarey et al. |
| 2024/0224024 | A1 | 7/2024 | Mukherjee et al. |
| 2024/0251230 | A1 | 7/2024 | Gupta |
| 2024/0273570 | A1 | 8/2024 | Bender et al. |
| 2024/0284165 | A1 | 8/2024 | Li |
| 2024/0305961 | A1 | 9/2024 | Simon et al. |
| 2025/0142318 | A1 | 5/2025 | Eldar |
| 2025/0267461 | A1 | 8/2025 | Eriksson |

FOREIGN PATENT DOCUMENTS

| | | |
|---|---|---|
| CN | 113391972 A | 9/2021 |
| EP | 3282358 A1 | 2/2018 |
| EP | 3742771 A1 | 11/2020 |
| EP | 3840439 A2 | 6/2021 |
| JP | 2005-267014 A | 9/2005 |
| KR | 10-2011-0056058 A | 5/2011 |
| WO | 99/01975 A1 | 1/1999 |
| WO | 2009/137882 A1 | 11/2009 |
| WO | 2011/036484 A2 | 3/2011 |
| WO | 2012/079380 A1 | 6/2012 |
| WO | 2015/036816 A1 | 3/2015 |
| WO | 2015/080639 A1 | 6/2015 |
| WO | 2021/051219 A1 | 3/2021 |
| WO | 2022/092805 A1 | 5/2022 |
| WO | 2022/124679 A1 | 6/2022 |

OTHER PUBLICATIONS

Bei et al., "Network Switch Systems and Methods," U.S. Appl. No. 18/812,900, filed Aug. 22, 2024.

Bei et al., "Network Switch Systems and Methods," U.S. Appl. No. 18/812,902, filed Aug. 22, 2024.

Bei et al., "Network Switch Systems and Methods," U.S. Appl. No. 18/812,903, filed Aug. 22, 2024.

Dynamically Updating SIM Cards Over the Air—Filed: Nov. 14, 2023—U.S. Appl. No. 18/508,931—First Named Inventor: Prayash Mukherjee.

Dyoniziak et al., "Detecting Content of Interest in Streaming Media," U.S. Appl. No. 17/827,211, filed May 27, 2022. (36 Pages).

Eldar et al., "Interface for Digital Operator Platform Including Asynchronous Connection Compatibility," U.S. Appl. No. 18/595,212, filed Mar. 4, 2024.

Eldar et al., "Interface for Digital Operator Platform Including Mobile Virtual Network Enabler Selector," U.S. Appl. No. 18/595,203, filed Mar. 4, 2024.

Eldar et al., "Interface for Digital Operator Platform Including Task Disaggregation," U.S. Appl. No. 18/595,233, filed Mar. 4, 2024.

Eldar et al., "Interface for Digital Operator Platform," 18/595,194, filed Mar. 4, 2024.

Eldar et al., "Network Switching Including Client Identifier Query," U.S. Appl. No. 18/587,513, filed Feb. 26, 2024.

Eldar et al., "Network Switching Including New Account Identifier Generation and Database Management," U.S. Appl. No. 18/587,470, filed Feb. 26, 2024.

Eldar et al., "Network Switching Including Proactive Network Switch Initiation," U.S. Appl. No. 18/587,528, filed Feb. 26, 2024.

Eldar et al., "Network Switching Including User Profile Field Cloning," U.S. Appl. No. 18/587,500, filed Feb. 26, 2024.

Eldar et al., Network Switching Including Network Switch Availability Verification, U.S. Appl. No. 18/587,460, filed Feb. 26, 2024.

Eldar et al., Network Switching Including Porting in a Phone Number to a Target Network, U.S. Appl. No. 18/587,440, filed Feb. 26, 2024.

(56) References Cited

OTHER PUBLICATIONS

GSM Association, "Embedded SIM Remote Provisioning Architecture Version 1.1," Official Document SGP.01, Jan. 30, 2014, 85 pages.

GSM Association, "Internet of Things—How It Works," 2021, retrieved from https://www.gsma.com/iot/embedded-sim/how-it-works/, retrieved on Sep. 15, 2021, 4 pages.

GSM Association, "Remote Provisioning Architecture for Embedded UICC Test Specification Version 4.0," Official Document SGP.11, May 20, 2019, 782 pages.

GSM Association, "Requirements for Multi SIM Devices," Version 8.0, Jul. 1, 2021, 26 pages.

GSM Association, "RSP Technical Specification Version 2.3," Official Document SGP.22, Jun. 30, 2021, 274 pages.

GSMA Association et al: "Remote Provisioning Architecture for Embedded UICC Technical Specification (Version 3.2)", Official Document, Jun. 27, 2017, pp. 1-309.

Hieb et al., "Carrier Controlled Cellular Telephone Network Migration," U.S. Appl. No. 19/191,910, filed Apr. 28, 2025.

International Search Report and Written Opinion of the International Searching Authority (EPO) issued in PCT Application No. PCT/US2023/074581 on Nov. 29, 2023.

International Search Report and Written Opinion received for PCT Patent Application No. PCT/US2022/043348, mailed on Dec. 23, 2022, 14 pages.

International Search Report and Written Opinion received for PCT Patent Application No. PCT/US23/74585, mailed on Mar. 12, 2024, 18 pages.

International Search Report and Written Opinion received for PCT Patent Application No. PCT/US24/46589, mailed on Oct. 24, 2024, 14 pages.

Localization of Wireless Equipment Based on Network Usage Data—Filed: Dec. 28, 2023—U.S. Appl. No. 18/399,201—First Named Inventor: Dmitry Dimov.

Nemalipuri et al., "Advertisement Caching for Targeted Delivery," U.S. Appl. No. 18/488,726, filed Oct. 17, 2023. (23 pages).

Nemalipuri, "Prefetching Advertisements for Streaming Delivery," U.S. Appl. No. 18/449,976, filed Aug. 15, 2023. (22 pages).

Partial International Search Results Communication issued by the European Patent Office as the International Searching Authority in PCT Application No. PCT/US2023/074585 on Jan. 17, 2024.

Pre-Download Customization of Electronic Subscriber Identity Module (ESIM)—Filed: Feb. 16, 2023—U.S. Appl. No. 18/110,690—First Named Inventor: Yongjia Li.

Providing Wireless Services Based on Using Subscriber Geospatial Activity—Filed: Dec. 11, 2023—U.S. Appl. No. 18/535,633—First Named Inventor: Mikhail Arbuzov.

Suzuki et al., "Standardization of Embedded UICC Remote Provisioning," NTT Docomo Technical Journal 16 (2):36-41, 2014.

The 3G4G Blog, "M2M embedded UICC (eSIM) Architecture and Use Cases," Dec. 23, 2014, retrieved from https://blog.3g4g.co.uk/2014/12/m2m-embedded-uicc-esim-architecture-and.html, retrieved on Sep. 15, 2021, 3 pages.

Wendeborn et al., "Network Move Systems and Methods," U.S. Appl. No. 18/902,230, filed Sep. 30, 2024.

Wendeborn et al., "Network Move Systems and Methods," U.S. Appl. No. 18/902,236, filed Sep. 30, 2024.

Wendeborn et al., "Network Move Systems and Methods," U.S. Appl. No. 18/902,241, filed Sep. 30, 2024.

Wendeborn et al., "Network Move Systems and Methods," U.S. Appl. No. 18/902,244, filed Sep. 30, 2024.

Analysis on the Awareness and Effect of Mobile No. Portability in Aizawl, Mizoram. Francis Lalmuansanga. (Year: 2022).

Techno-Economic and Regulation Impact Analysis of Mobile No. Portability Implementation. Rizal. IEEE. (Year: 2013).

\* cited by examiner

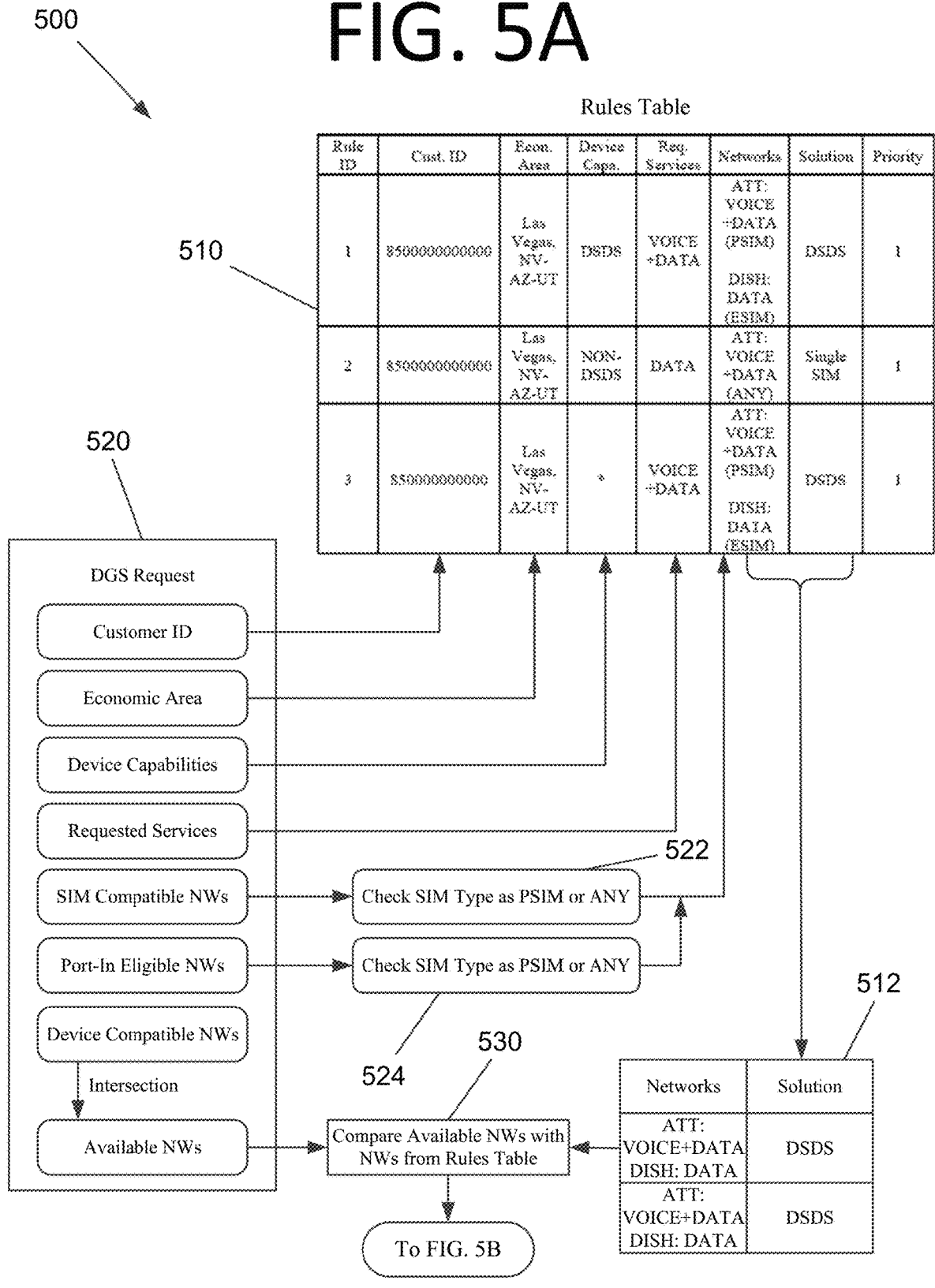

500

510

520

Rules Table

| Rule ID | Cust. ID | Econ. Area | Device Capa. | Req. Services | Networks | Solution | Priority |
|---|---|---|---|---|---|---|---|
| 1 | 8500000000000 | Las Vegas, NV-AZ-UT | DSDS | VOICE +DATA | ATT: VOICE +DATA (PSIM) DISH: DATA (ESIM) | DSDS | 1 |
| 2 | 8500000000000 | Las Vegas, NV-AZ-UT | NON-DSDS | DATA | ATT: VOICE +DATA (ANY) | Single SIM | 1 |
| 3 | 850000000000 | Las Vegas, NV-AZ-UT | * | VOICE +DATA | ATT: VOICE +DATA (PSIM) DISH: DATA (ESIM) | DSDS | 1 |

DGS Request

Customer ID

Economic Area

Device Capabilities

Requested Services

SIM Compatible NWs → Check SIM Type as PSIM or ANY   522

Port-In Eligible NWs → Check SIM Type as PSIM or ANY

Device Compatible NWs

Intersection

Available NWs

524

530

Compare Available NWs with NWs from Rules Table

| Networks | Solution |
|---|---|
| ATT: VOICE+DATA DISH: DATA | DSDS |
| ATT: VOICE+DATA DISH: DATA | DSDS |

600

600

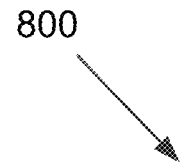
FIG. 8
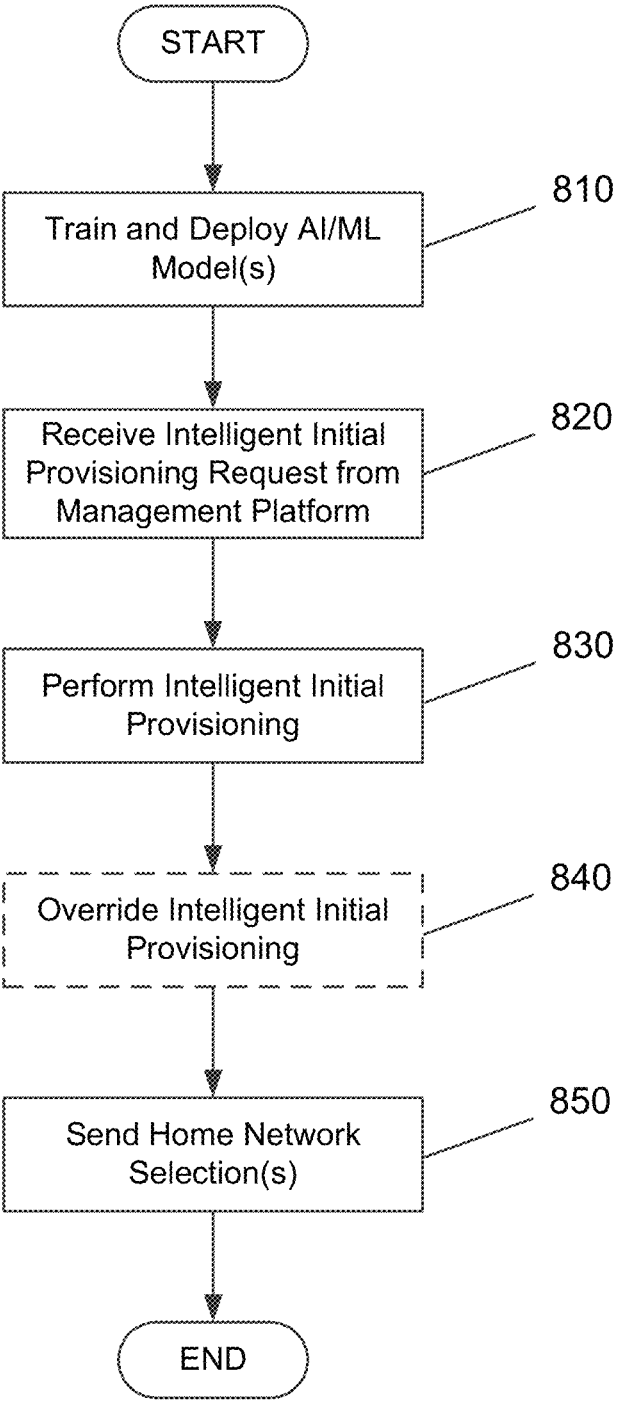

900

1100

INTELLIGENT INITIAL PROVISIONING FOR USER EQUIPMENT WITH ONE OR MORE SUBSCRIBER IDENTITY MODULES

CROSS-REFERENCE TO RELATED APPLICATION

This application claims the benefit of U.S. Provisional Patent Application No. 63/439,816 filed Jan. 18, 2023. The subject matter of this earlier filed application is hereby incorporated by reference in its entirety.

FIELD

The present invention generally relates to communications, and more specifically, to intelligent initial provisioning for User Equipment (UE) with one or more Subscriber Identity Modules (SIMs).

BACKGROUND

A SIM allows UE, such as mobile devices, desktop computers with appropriate hardware, vehicle telecommunications systems, etc., to be identified and authenticated on a network. The UE is identified by the International Mobile Subscriber Identity (IMSI) number associated with the SIM. The SIM identifies which service provider network that the UE connects with.

Network service providers may provide subscribers (i.e., users) with UE that has a preinstalled SIM for their network, or users may insert a SIM for the network into their own UE. The SIM may also be associated a phone number for the device. A SIM may be a physical SIM (pSIM) or an embedded SIM (eSIM). A pSIM is a physical card that is inserted into an associated slot in the UE. An eSIM, on the other hand, is a digital version of a pSIM including a profile that can be downloaded to the UE to provide the functionality of a pSIM.

Currently, users are initially provisioned to a home network based on criteria from a Mobile Network Operator (MNO), a Mobile Virtual Network Operator (MVNO), a Mobile Virtual Network Aggregator (MVNA), or a Mobile Virtual Network Enabler (MVNE). An MNO is a wireless communications service provider that owns wireless infrastructure, such as DISH®, AT&T®, T-Mobile©, and Verizon®. An MVNO is a wireless communications service provider that does not own the wireless network infrastructure over which the MVNO provides service to its subscribers, such as Consumer Cellular®, Cricket Wireless®, Mint Mobile®, etc. It should be noted that as used herein, "customer" refers to an MVNO whereas "subscriber" refers to a user of the mobile device. An MVNA is a provider that buys access to an MNO network and then sells this access to MVNOs. An MVNE supplies the infrastructure needed for MVNOs to operate and provide services. For instance, an MVNE may provide planning, billing, customer service, and provisioning for an MVNO, but does not provide the actual connectivity services. The connectivity services are provided by the MNO.

Currently, MVNOs or MVNEs choose the network that the subscriber will initially be provisioned on. However, this initial provisioning may not provide the preferred or optimal service based on signal strength, network congestion, subscription criteria, MNO/MVNO/MVNA/MVNE contract criteria, etc. Accordingly, an improved and/or alternative approach may be beneficial.

SUMMARY

Certain embodiments of the present invention may provide solutions to the problems and needs in the art that have not yet been fully identified, appreciated, or solved by current communication technologies, and/or provide a useful alternative thereto. For example, some embodiments of the present invention pertain to intelligent initial provisioning for UE with one or more SIMs.

In an embodiment, one or more non-transitory computer-readable media store one or more computer programs. The one or more computer programs are configured to cause at least one processor to perform intelligent initial provisioning for UE to determine a home network for the UE by analyzing intelligent initial provisioning criteria. The computer program is also configured to cause the at least one processor to send the home network selection from the intelligent initial provisioning to the UE. The intelligent initial provisioning criteria include a home location of the UE and hardware and software capabilities of the UE. The home network selection includes whether to provision onto the home network directly or through a third party.

In another embodiment, a computer-implemented method includes receiving an intelligent initial provisioning request from a management platform, by one or more computing systems. The initial provisioning request includes hardware and software capabilities of UE. The computer-implemented method also includes performing intelligent initial provisioning for the UE to determine a home network for the UE by analyzing intelligent initial provisioning criteria using the received intelligent initial provisioning request from the UE, by the one or more computing systems. The computer-implemented method further includes sending the home network selection from the intelligent initial provisioning to the UE, by the one or more computing systems. The intelligent initial provisioning criteria comprise a home location of the UE and hardware and software capabilities of the UE. The home network selection includes whether to provision onto the home network directly or through a third party.

In yet another embodiment, one or more computing systems include memory storing computer program instructions and at least one processor configured to execute the computer program instructions. The computer program instructions are configured to cause at least one processor to receive an intelligent initial provisioning request from a management platform. The initial provisioning request includes hardware and software capabilities of the UE. The computer program instructions are also configured to cause the at least one processor to perform intelligent initial provisioning for the UE to determine a home network for the UE by analyzing intelligent initial provisioning criteria using the received intelligent initial provisioning request from the UE. The computer program instructions are further configured to cause the at least one processor to send the home network selection from the intelligent initial provisioning to the UE. The intelligent initial provisioning criteria include a home location of the UE and hardware and software capabilities of the UE. The intelligent initial provisioning request is an intent service request. The intelligent initial provisioning includes executing an intent service comprising a data gathering service and a rules engine service.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 5A and 5B are flow diagrams illustrating a process for a rules engine for intelligent provisioning, according to an embodiment of the present invention.

FIG. 8 is a flowchart illustrating a process for performing intelligent initial provisioning for UE, according to an embodiment of the present invention.

Unless otherwise indicated, similar reference characters denote corresponding features consistently throughout the attached drawings.

DETAILED DESCRIPTION OF THE EMBODIMENTS

Figure 1:
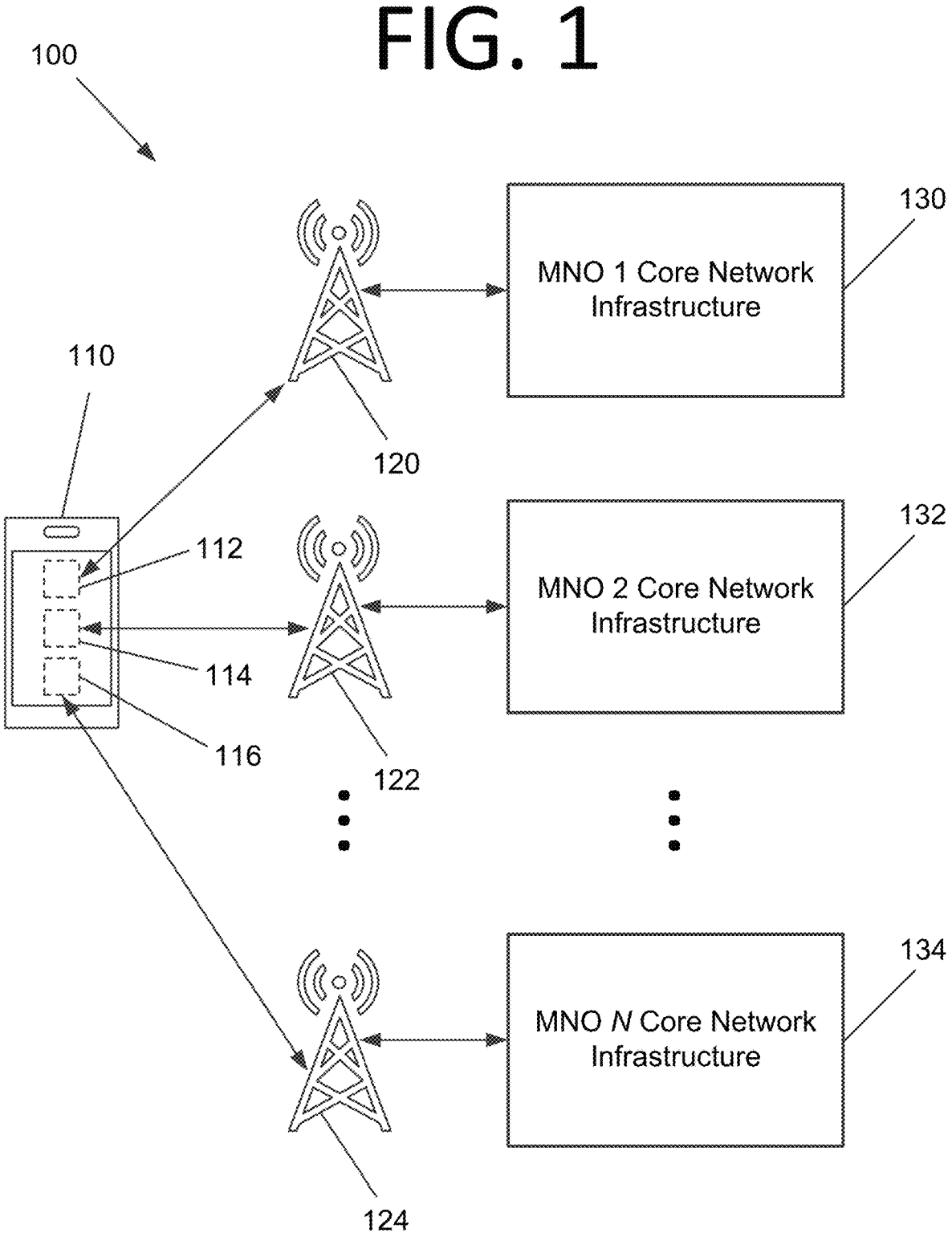
FIG. 1 is an architectural diagram illustrating a wireless communications system with multiple MNO networks and UE that are configured to implement intelligent initial provisioning, according to an embodiment of the present invention.

Some embodiments pertain to intelligent initial provisioning for UE with one or more SIMs. As used herein, "intelligent initial provisioning" is the selection and provisioning of subscribers on a network from among multiple MNO networks (e.g., on DISH®, AT&T®, T-Mobile©, or Verizon®) using a respective SIM. In other words, intelligent initial provisioning pertains to selecting the home network of the UE. Home network routing determines which MNO handles phone calls and Short Message Service (SMS) text messages, whose equipment is used, etc. For example, data traffic may be routed to DISH®, but voice and SMS traffic may be routed to another MNO.

Based on the current needs of the MNO/MVNO/MVNA/ MVNE, a network is selected from multiple networks supported by the UE. The selection may be made based on criteria such as the home location of the UE (e.g., as determined by the location of the store that sold the UE, the user's home address, the user's zip code, etc.), the capabilities of the UE (e.g., supported bands, SIMs, etc.), phone number eligibility (e.g., phone numbers not be assigned in a certain rate center, certain ports may not be allowed, etc.), the average signal strength of the MNO networks in the area, the typical congestion on the MNO networks, the number or percentage of subscribers of the initial provisioning entity that are on the MNO networks, cost criteria, subscription criteria, MNO contract criteria, highest service quality, lowest voice and SMS service cost, any combination thereof, etc. Forecasts of future traffic on the MNO networks may also factor into the intelligent initial provisioning. In some embodiments, the initial provisioning policy may prioritize certain available bands over others. Bands and/or three-channel aggregation (3CA) band combinations may be enabled or disabled based on the available MNO networks. MNO networks enabling functionality such as Voice over New Radio (VoNR), Voice over Long Term Evolution (VoLTE), etc. may be preferred over MNO networks that lack such services in some embodiments.

In some embodiments, the initial provisioning is abstracted from the MVNO subscribers. For instance, the UE may not show the user that initial provisioning on a given network is occurring, and it may appear to the user that the UE is operating on the MVNO's network. The initial provisioning may also be made based on agreements by the MVNO rather than based on decisions by retailers.

In some embodiments, "canary" factors are used in the intelligent initial provisioning process. For instance, a certain number or percentage of subscribers may be driven to an MNO network or spread across multiple MNO networks, such as initially provisioning 20% of subscribers to AT&T®, 10% to T-Mobile©, 5% to Verizon®, and the remainder to DISH®. In some embodiments, this may be implemented using a pseudo-random algorithm that selects a number from 0 to 100 (e.g., using the Random( ) function in C #) and assigning UE with numbers from 0-4 to Verizon®, 5-14 to T-Mobile®, 15-34 to AT&T®, and 35-100 to DISH®.

Canary factors may be used to control rollout onto a network, such as onto DISH® Radio Access Networks (RANs) as the number of RANs and retail stores increases over time. Canary factors may be controlled by MVNOs, the market area (Federal Communications Commission (FCC) business economic areas, zip codes, etc.), sales channels from retail, MNO networks themselves, etc. There may be other use cases as well. For instance, a provider may want to drive retail store subscribers to one home network and online purchase subscribers to another home network.

Intelligent initial provisioning may be controlled at least in part by contractual obligations. For instance, if a contract with an MNO requires an MVNO to drive a certain number or percentage of subscribers to its network, this may be accomplished by initially provisioning UE to that MNO until the contractual criteria are met. Alternatively, if the MNO fee increases after the number of MVNO subscribers on the MNO network exceeds a certain number, the intelligent initial provisioning logic may choose other MNO(s)

as the home network(s) for new subscribers. As contracts expire, such criteria may be removed from the intelligent initial provisioning logic.

In some embodiments, the intelligent initial provisioning logic may use Artificial Intelligence (AI), employing Machine Learning (ML) models to learn MNO network characteristics, learn intelligent provisioning criteria weights, etc. Such AI/ML-based techniques may take into account how the MNO networks are performing at a given time, whether there is dynamic pricing or contractual obligations for a given MNO, etc. Such AI/ML-based techniques could also monitor MNO network performance over time and then drive other subscribers to a different network if the performance degrades. For instance, the AI/ML model(s) may learn that a given MNO network does not perform well at a certain time, the MNO network tends not to perform well for a given UE model, etc.

In some embodiments, the intelligent initial provisioning process may include using multiple SIMs for different services. For instance, voice traffic and Internet Protocol (IP) Multimedia Subsystem (IMS) traffic may be handled on one SIM for one MNO network and data traffic may be handled on another SIM for another MNO network, if available. Typically, the SIMs share a single transceiver. Through Time Division Multiplexing (TDM), the radio connections for each SIM may be maintained in idle mode.

FIG. 1 is an architectural diagram illustrating a wireless communications system 100 with multiple (N) MNO networks and UE 110 that are configured to implement intelligent initial provisioning, according to an embodiment of the present invention. UE 110 includes three SIMs in this embodiment—SIM 112 for MNO 1, SIM 114 for MNO 2, and SIM 116 for MNO N. Any desired number of SIMs may be included in UE 110 without deviating from the scope of the invention. Also, SIMs 112, 114, 116 may be pSIMs, eSIMs, or a combination thereof. In some embodiments, a universal SIM may be used in place of multiple SIMs, and the appropriate eSIM may be downloaded after the network is selected in the initial provisioning process. SIMs 112, 114, 116 allow UE 110 to communicate with MNO 1 network infrastructure 130, MNO 2 network infrastructure 132, and MNO N network infrastructure 134 via respective RANs 120, 122, . . . , 124. In some embodiments, UE 110, computing systems of RANs 120, 122, . . . , 124, and/or computing systems of MNO core network infrastructure 130, 132, . . . , 134 may be computing system 1100 of FIG. 11.

MNO core network infrastructure 130, 132, 134 may include computing systems and other equipment associated with Local Data Centers (LDCs), Pass-through Edge Data Centers (PEDCs), Breakout Edge Data Centers (BEDCs), Regional Data Centers (RDCs), National Data Centers (NDCs), etc. Carrier network infrastructure 130, 132, 134 may provide various Network Functions (NFs) and other services. For instance, BEDCs may break out User Plane Function (UPF) data traffic (UPF-d) and provide cloud computing resources and cached content to UE 110, such as providing NF application services for gaming, enterprise applications, etc. RDCs may provide core network functions, such as UPF for voice traffic (UPF-v), UPF for data traffic, UPF-d (if not provided by a BEDC), Session Management Function (SMF), and Access and Mobility Management Function (AMF) functionality. The SMF includes Packet Data Network Gateway (PGW) Control Plane (PGW-C) functionality. The UPF includes PGW User Data Plane (PGW-U) functionality.

NDCs may provide a Unified Data Repository (UDR) and user verification services, for example. Other network services that may be provided may include, but are not limited to, IP Multimedia Subsystem (IMS)+Telephone Answering Service (TAS), IP-SM Gateway (IP-SM-GW) (the network functionality that provides the messaging service in the IMS network), Enhanced Serving Mobile Location Center (E-SMLC) for former generation wireless networks, Gateway Mobile Location Center (GMLC), Location Retrieval Function (LRF), Location Management Function (LMF), Home Location Register (HLR), Home Subscriber Server (HSS), Unified Data Management (UDM), Authentication Server Function (AUSF), Unified Data Repository (UDR), Short Message Service Center (SMSC), PCF, Mobile Edge Computing (MEC), Network Exposure Functions (NEFs) or Common Application Programming Interface (API) Framework (CAPIF) for Third Generation Partnership Project (3GPP) northbound APIs, Network Slice Selection Function (NSSF), Non-3GPP InterWorking Function (N3IWF), Network Data Analytics Function (NWDAF), Mediation and Delivery Function (MDF), Service Communication Proxy (SCP), and/or Security Edge Protection Proxy (SEPP) functionality. It should be noted that additional and/or different network functionality may be provided without deviating from the present invention. The various functions in these MNO systems may be performed using dockerized clusters in some embodiments.

UE 110 may start the intelligent initial provisioning process in some embodiments. For instance, if UE 110 is a DISH® device and MNO 1 core network infrastructure 130 belongs to DISH®, UE 110 may reach out to MNO 1 core network infrastructure 130 via RAN 120. In some embodiments, UE 110 may provide MNO 1 core network infrastructure 130 with certain information, such as the device model, device capabilities (e.g., supported bands, the types of SIMs that are present and/or supported, the detected signal strength of RANs 120, 122, . . . , 124, etc.), etc. MNO 1 core network infrastructure 130, using an intent engine, determines where UE 110 should be initially provisioned based on the initial provisioning criteria, such as that discussed above. MNO 1 core network infrastructure 130 then informs UE 110 which network will be its home network. UE 110 then configures itself accordingly (e.g., configuring UE 110 to use SIM 112 and MNO 1 core network infrastructure 130 for all services, configuring UE 110 to use SIM 112 and MNO 1 core network infrastructure 130 for data and configuring UE 110 to use SIM 114 and MNO 2 core network infrastructure 132 for voice and SMS, etc.).

Figure 2:
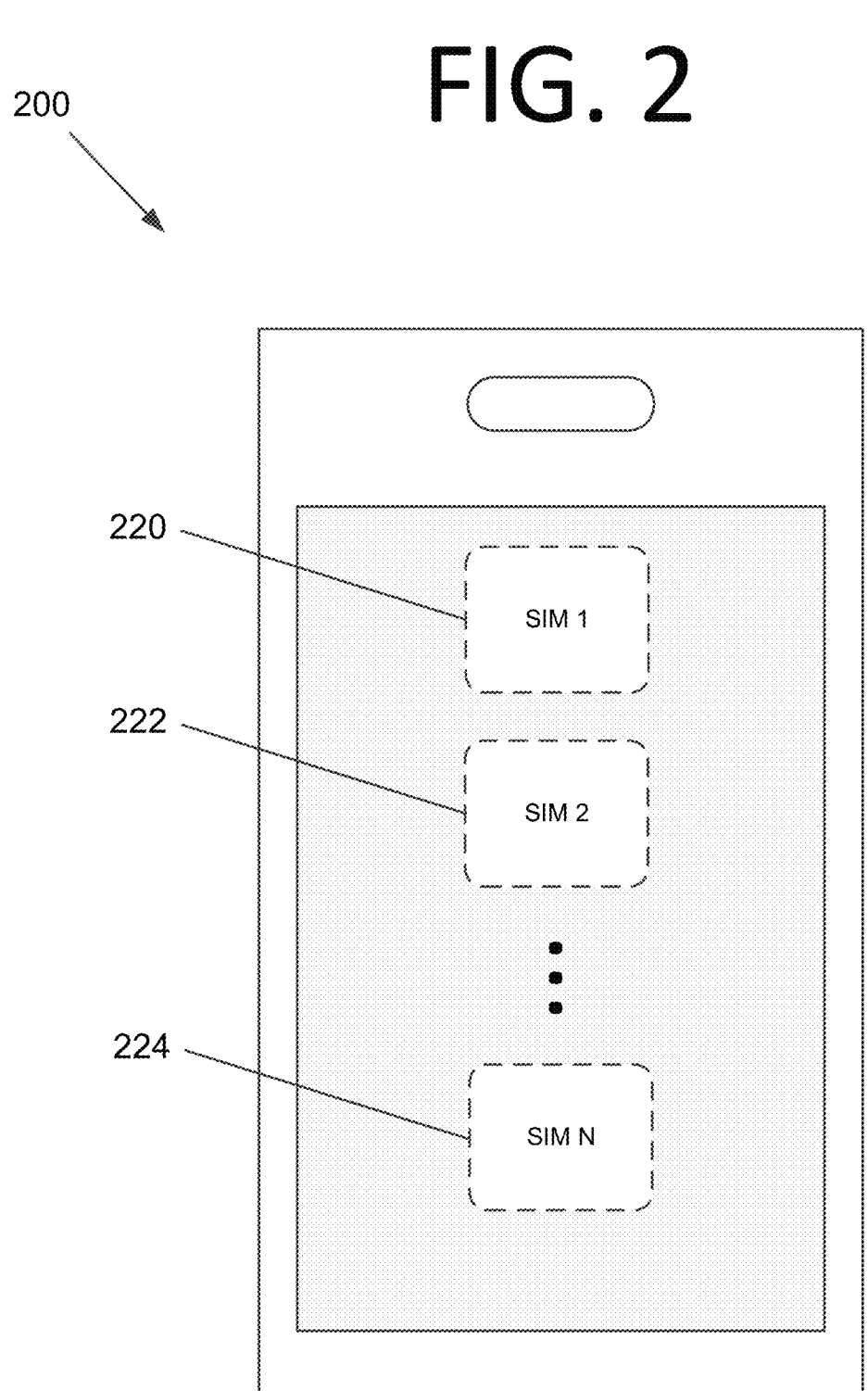
FIG. 2 illustrates a mobile device with multiple SIMs, according to an embodiment of the present invention.

FIG. 2 illustrates a mobile device 200 with multiple SIMs, according to an embodiment of the present invention. In some embodiments, mobile device 200 may be UE 110 of FIG. 1 and/or computing system 1100 of FIG. 11. Mobile device 200 has N SIMs in this embodiment (e.g., SIM 1 220, SIM 2 222, . . . , SIM N 224). Each of SIMs 1 to N may be a pSIM or an eSIM and is associated with a respective MNO.

In some embodiments, when a pSIM of UE is activated on an International Mobile Equipment Identity (IMEI), an eSIM is provisioned with an Endpoint Identifier (EID) of the UE. When the pSIM is inserted into the appropriate slot of the UE, a carrier application on the UE causes the UE to reach out to a carrier server to obtain an eSIM activation code. The carrier application communicates with an embedded Universal Integrated Circuit Card (eUICC) manager to download the eSIM profile (e.g., for Android®, using the downloadSubscription API of the eUICC manager). The eSIM is provisioned for data usage in some embodiments. In certain embodiments, when the pSIM is deactivated, the eSIM is also deactivated.

Figure 3:
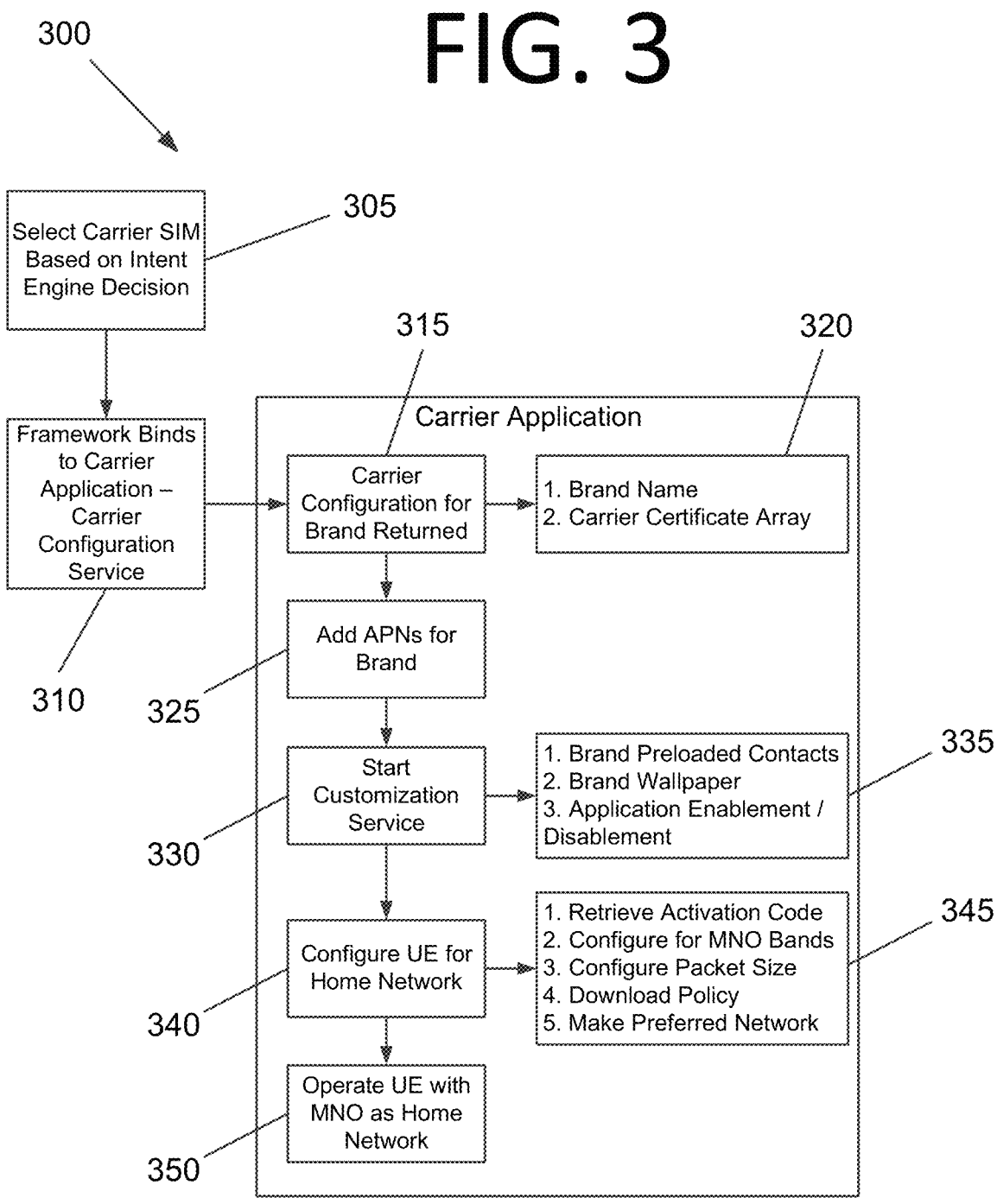
FIG. 3 is a flow diagram illustrating a process for configuring UE for an initially provisioned MNO network using a carrier application, according to an embodiment of the present invention.

FIG. 3 is a flow diagram illustrating a process 300 for configuring UE for an initially provisioned MNO network using a carrier application, according to an embodiment of the present invention. The process begins with selecting an MNO SIM for a home network based on initial provisioning instructions from an intent engine of an MNO or MVNO that the UE is branded for. This selection may include downloading an eSIM for the carrier in some embodiments. The UE framework (e.g., the operating system) binds to the carrier application of the UE at 310 via a carrier configuration service running within the carrier application in some embodiments. As used herein, "binding" refers to launching the carrier application and connecting to a service running within the carrier application. From that point onwards, the framework is able to invoke the APIs that are exposed by the service.

The carrier application determines which provisioned network to use for specific services, such as data vs. voice and SMS. The carrier application also helps facilitate download of the eSIM profile when an eSIM is used. The actual provisioning decisions are made by the intent engine.

The carrier configuration for the brand is returned at 315, including the brand name and carrier certificate array 320. The Access Point Names (APNs) for the brand are added at 325 and a customization service is started at 330. The customization service operations 335 include obtaining the brand preloaded contacts, the brand wallpaper, and the application enablement/disablement settings.

The home network configuration is then started at 340. The configuration operations 345 may include retrieving an activation code, configuring the UE for the bands used by the home network MNO, configuring the packet size to that used by the MNO, downloading a policy for the user's subscription, and making the MNO the preferred network. The policy may govern which MNO the UE uses for which services and under what conditions. The UE then operates with the MNO as the initially provisioned MNO as the home network at 350 using the SIM for that MNO.

In some embodiments, multiple microservices are employed in the intelligent initial provisioning process. For instance, a network selector may provide a service to a Digital Operator Platform (DOP), which is a retail ordering platform, that determines the SIM type to be selected by a retail location and the provisioning system that the retail location should route the order to. An intent service may provide a service to the network selector and a Component Object Model (COM) that provide the networks to be provisioned and the solution by calling a data gathering service and a rules engine. The inputs to the intent service may be the user or retail location address, UE device details, and SIM details, and the outputs may be the available MNO networks and the solution in some embodiments. For instance, the "network" output may include which MNO network(s) to use and which service(s) should be provisioned on each network. The solution output may include whether a single SIM solution or a Dual SIM Dual Standby (DSDS) solution will be used.

The data gathering service may perform network coverage checks for MNOs (e.g., DISH®, AT&T©, T-Mobile©, and Verizon®) and UE device and SIM compatibility checks. The data gathering service may then normalize the data for consumption by the intent service. The inputs to the data gathering service may be the user or retail location address, UE device details, and SIM details, and the outputs may be the economic area, coverage details, UE device capabilities, and available MNO networks in some embodiments. The rules engine applies business logic to determine the networks and solution to be used. The inputs to the rules engine may be the customer identifier (ID), economic area, UE device compatibility, requested services, and available networks, and the outputs may be the available MNO networks and the solution.

FIG. 4 is an architectural diagram illustrating an intent service process 400, according to an embodiment of the present invention. For DOP 410, network selector service 420 determines the SIM type to be selected by a retail location and the provisioning system that the retail location should route the order to. In network selector service 420, "BSS" stands for business support systems. Output from network selector service 420, COM 430, and an intent service request 440 are provided to intent service 450. Intent service request 440 includes a telephone number, a user or retail location address, UE device details, and SIM details.

Figure 4A:
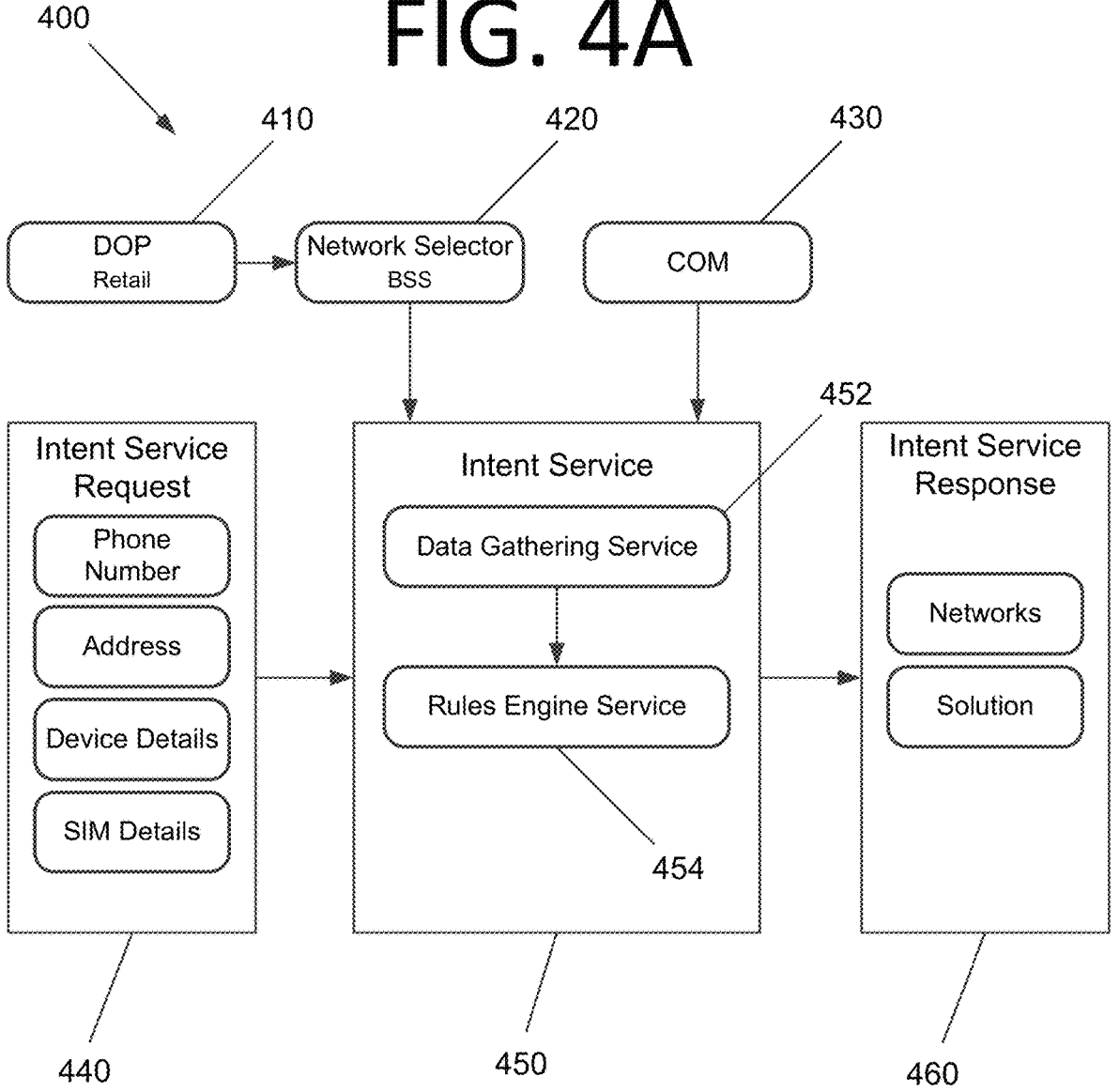
FIG. 4A is an architectural diagram illustrating an intent service process, according to an embodiment of the present invention.
Figure 4B:
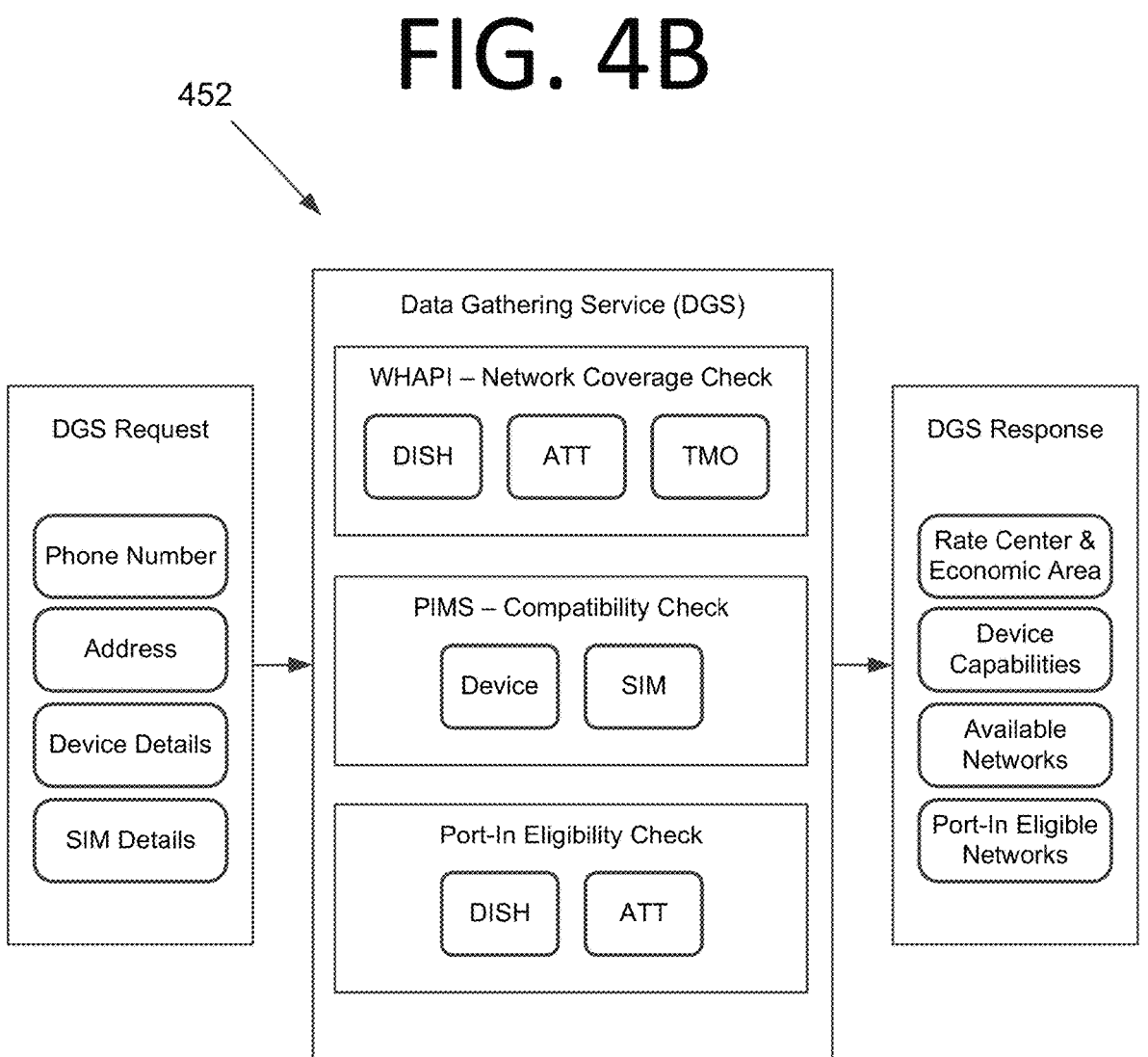
FIG. 4B is an architectural diagram illustrating a data gathering service process, according to an embodiment of the present invention.

Using input from network selector service 420, COM 430, and intent service request 440, intent service 450 implements a data gathering service (DGS) 452 (see FIG. 4B). DGS 452 queries multiple other systems and compiles and formats the data for use by intent engine 454. Intent engine 454 implements the business logic layer. For example, when the same input is used for both DGS 452 and a wrapper service, example JavaScript Object Notation (JSON) input may be as follows. The wrapper service is the front end outward facing API layer towards consumers.

```
{
    "dataServices": {
        "phoneNumber": {
            "pn": "5551231234"
        },
        "address": {
            "addressLine1": {
                "streetNumber": "123",
                "streetName": "Main",
                "streetType": "Street",
                "streetTrailingDirection": "N"
            },
            "city": "North Las Vegas",
            "state": "NV",
            "zipCode": "89030"
        },
        "deviceDetails": {
            "pei": "999999999999999"
        },
        "simDetails": {
            "iccid": "8888888888888888888"
        }
    },
    "ruleEngine": {
        "customerId": "850000000000",
        "requestedServices": "VOICE+DATA"
    }
}
```

Where "pn" is the phone number, "pei" is the permanent equipment identifier, and "iccid" is the integrated circuit card identification number. For SIM-only scenarios, example JSON input may be as follows.

```
{
    "dataServices": {
        "phoneNumber": {
            "pn": "5551231234"
        },
```

-continued

```
    "address": {
        "city": "Las Vegas",
        "state": "NV",
        "zipCode": "81021"
    },
        "iccid": "8888888888888888888"
    }
},
    "ruleEngine": {
        "customerId": "Customer1234",
        "requestedServices": "VOICE+DATA"
    }
}
```

Figure 4C:
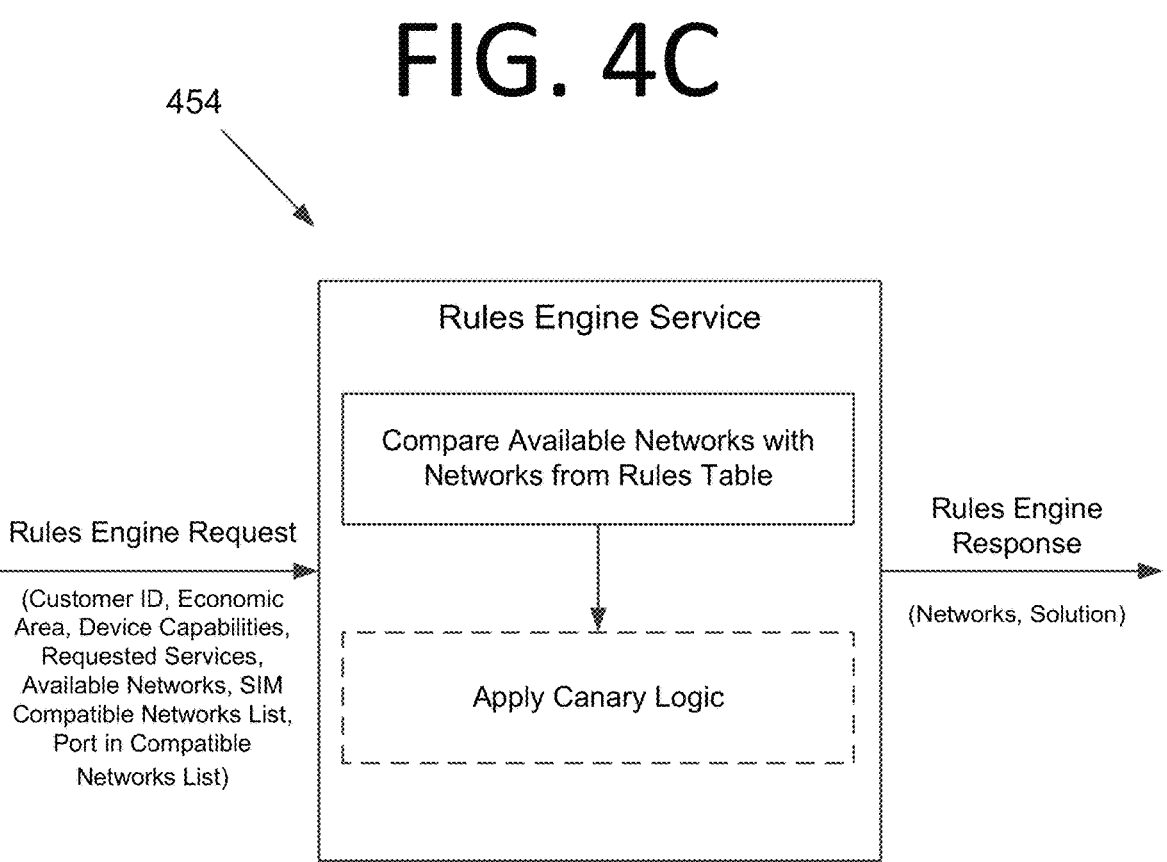
FIG. 4C is an architectural diagram illustrating a rules engine service process, according to an embodiment of the present invention.

Output from DGS 452 is provided to rules engine service 454 (see FIG. 4C). For instance, DGS 452 may return the economic area as a String, the device capabilities as a String (e.g., DSDS, NON-DSDS, or UNKNOWN), a network coverage list as a JavaScript Object Notation (JSON) object (e.g., DISH, ATT, TMO), and port-in eligible networks. Port-in/port-out is the process by which a subscriber with an MNO is able to bring or port his or her telephone number to a new/different MNO as part of changing the carrier. Generally, this is referred to in the industry as "Local Number Portability". Example rules are provided in Table 1 below.

TABLE 1

EXAMPLE RULES FOR RULES ENGINE SERVICE

| Rule Number: | Rule Description: |
|---|---|
| 1 | Restrict to allowable networks passed from retain and enabled networks |
| 2 | Select rules with matching customer ID from primary rules table |
| 3 | Restrict to device capabilities (e.g., DSDS, non-DSDS, and unknown) |

TABLE 1-continued

EXAMPLE RULES FOR RULES ENGINE SERVICE

| Rule Number: | Rule Description: |
|---|---|
| 4 | Restrict to appropriate economic area |
| 5 | Requested services (data or data + voice/SMS) |
| 6 | SIM compatibility (DISH ®, AT&T ®, T-Mobile ®, and/or Verizon ®) |
| 7 | Device compatibility (DISH ®, AT&T ®, T-Mobile ®, and Verizon ®) |
| 8 | Port-in eligibility (DISH ®, AT&T ®, T-Mobile ®, and Verizon ®) |
| 9 | Network coverage (DISH ®, AT&T ®, T-Mobile ®, and Verizon ®) |
| 10 | Preferred network for UE make and model |
| 11 | Preferred network for bring your own device (BYOD) customers |
| 12 | Preferred network for customer's zip code |
| 13 | Network canaries |
| 14 | Best match (fewest wildcards) |
| 15 | Highest priority rule |
| 16 | Arbitrary rule (if multiple networks are still present) |

The intent service response 460 in FIG. 4A includes the MNO network(s) onto which UE will be provisioned and the solution from rules engine service 454. The output may also include how to provision onto the MNO network(s), such as whether to provision directly onto the MNO network(s) or whether to do so through a third party (e.g., through an MNO stack provided by DISH®).

Figure 5B:
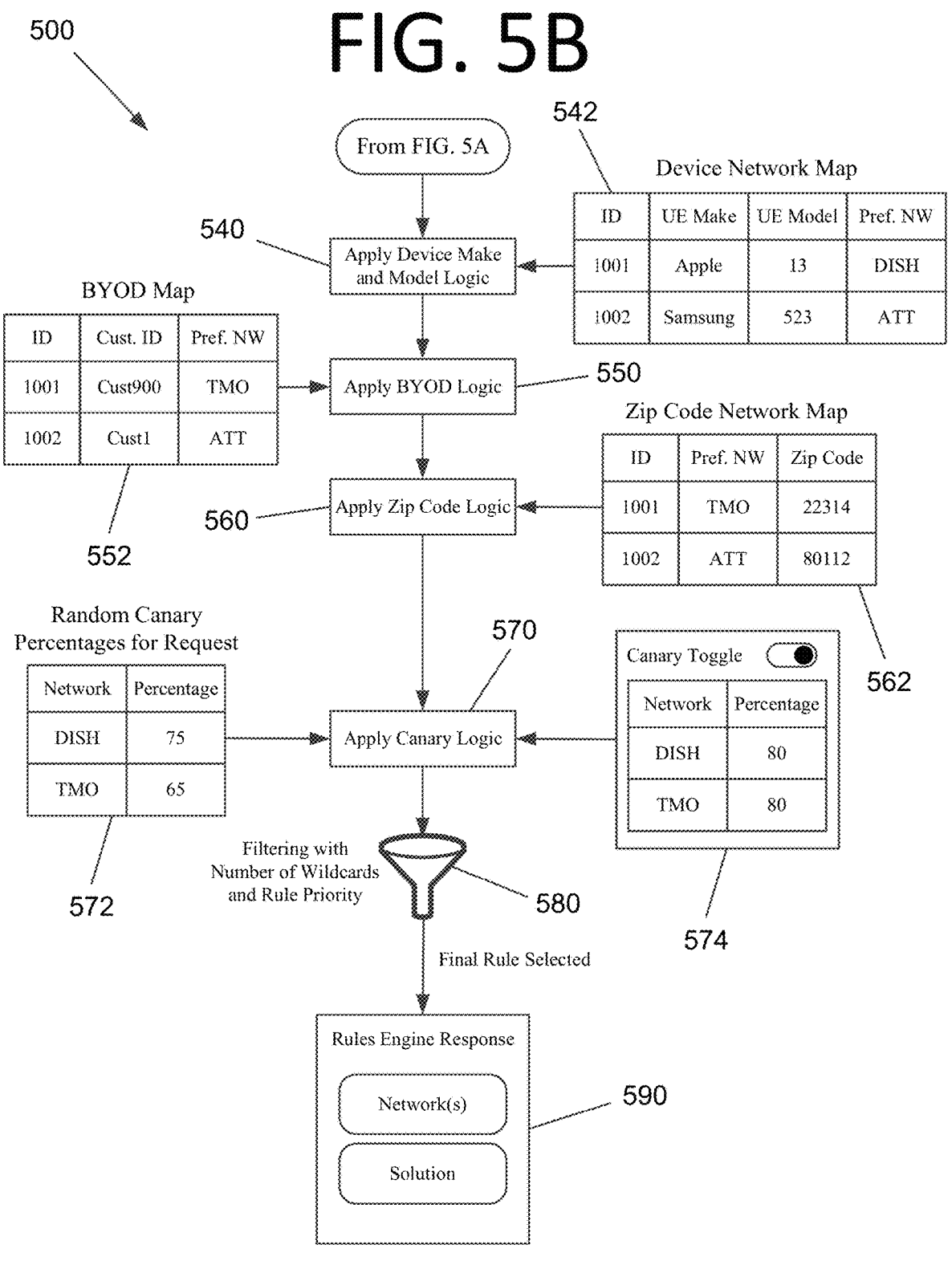

FIGS. 5A and 5B are flow diagrams illustrating a process 500 for a rules engine for intelligent provisioning, according to an embodiment of the present invention. Example rules table 510 is also shown in Table 2 below.

TABLE 2

EXAMPLE RULES TABLE

| Rule ID | Cust. ID | Econ. Area | Device Capa. | Req. Services | Networks | Solution | Priority |
|---|---|---|---|---|---|---|---|
| 1 | 8500000000000 | Las Vegas, NV-AZ-UT | DSDS | VOICE + DATA | ATT: VOICE + DATA (PSIM) DISH: DATA (ESIM) | DSDS | 1 |
| 2 | 8500000000000 | Las Vegas, NV-AZ-UT | NON-DSDS | DATA | ATT: VOICE + DATA (ANY) | Single SIM | 1 |
| 3 | 850000000000 | Las Vegas, NV-AZ-UT | * | VOICE + DATA | ATT: VOICE + DATA (PSIM) DISH: DATA (ESIM) | DSDS | 1 |

A DGS request 520 provides a customer ID, an economic area, device compatibility, requested services, SIM compatible networks port-in eligible networks, device compatible networks, and available networks. The customer ID, an economic area, device compatibility, requested services, and SIM type from the SIM compatible networks check at 522 and the port-in eligible networks check at 524 are compared to rules in rules table 510. Networks/solutions 512 matching these criteria from rules table 510 are compared at 530 to available networks (the intersection of device compatible networks and available networks from DGS request 520).

Turning to FIG. 5B, device make and model logic 542 is applied using device network map table 542, BYOD logic 550 is applied using BYOD map 552, zip code logic 560 is applied using zip code network map 562, and canary logic 570 is applied using random canary percentages table 572 or fixed canary percentages table 574 if canary toggle is on. The details of steps 540, 550, 560, and 570 are discussed further with respect to FIGS. 6A-C. The results are filtered with the number of wildcards and the rule priority at 580 to obtain a final rule selection. The final rule selection is then used to provide the network(s) and solution in rules engine response 590.

Figure 6A:
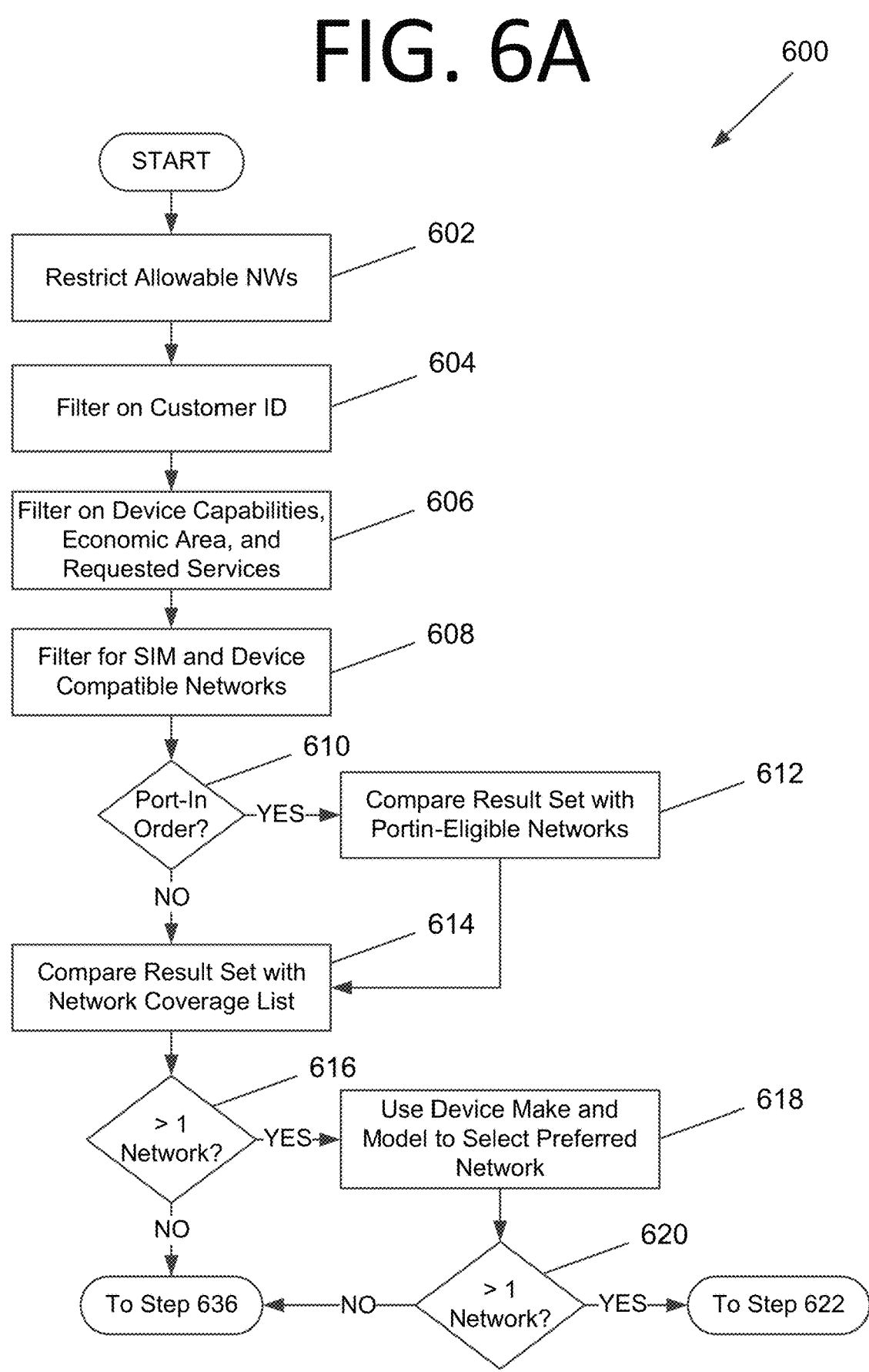
FIGS. 6A-C are a flowchart illustrating a rules engine service process, according to an embodiment of the present invention.
Figure 6B:
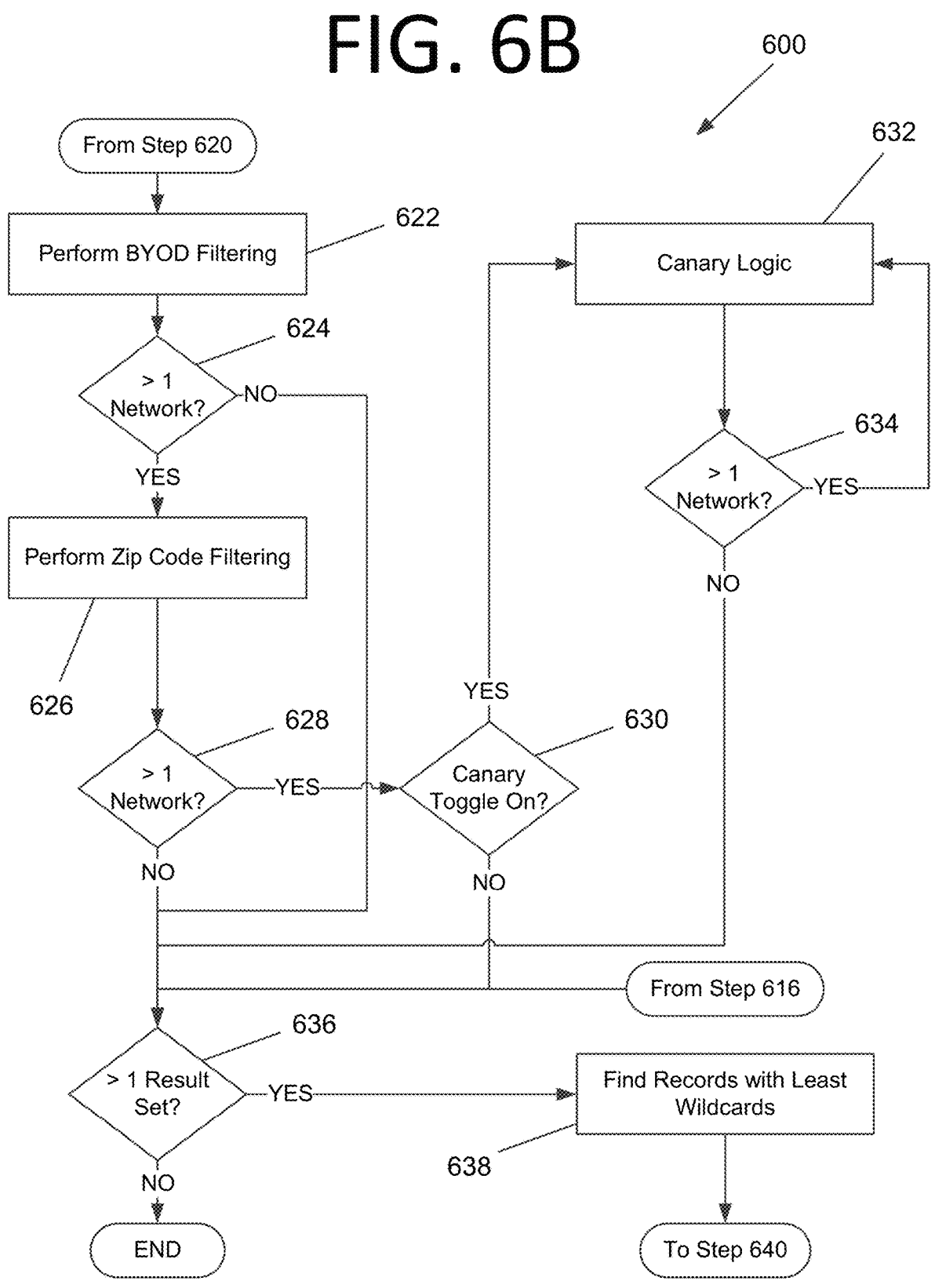
Figure 6C:
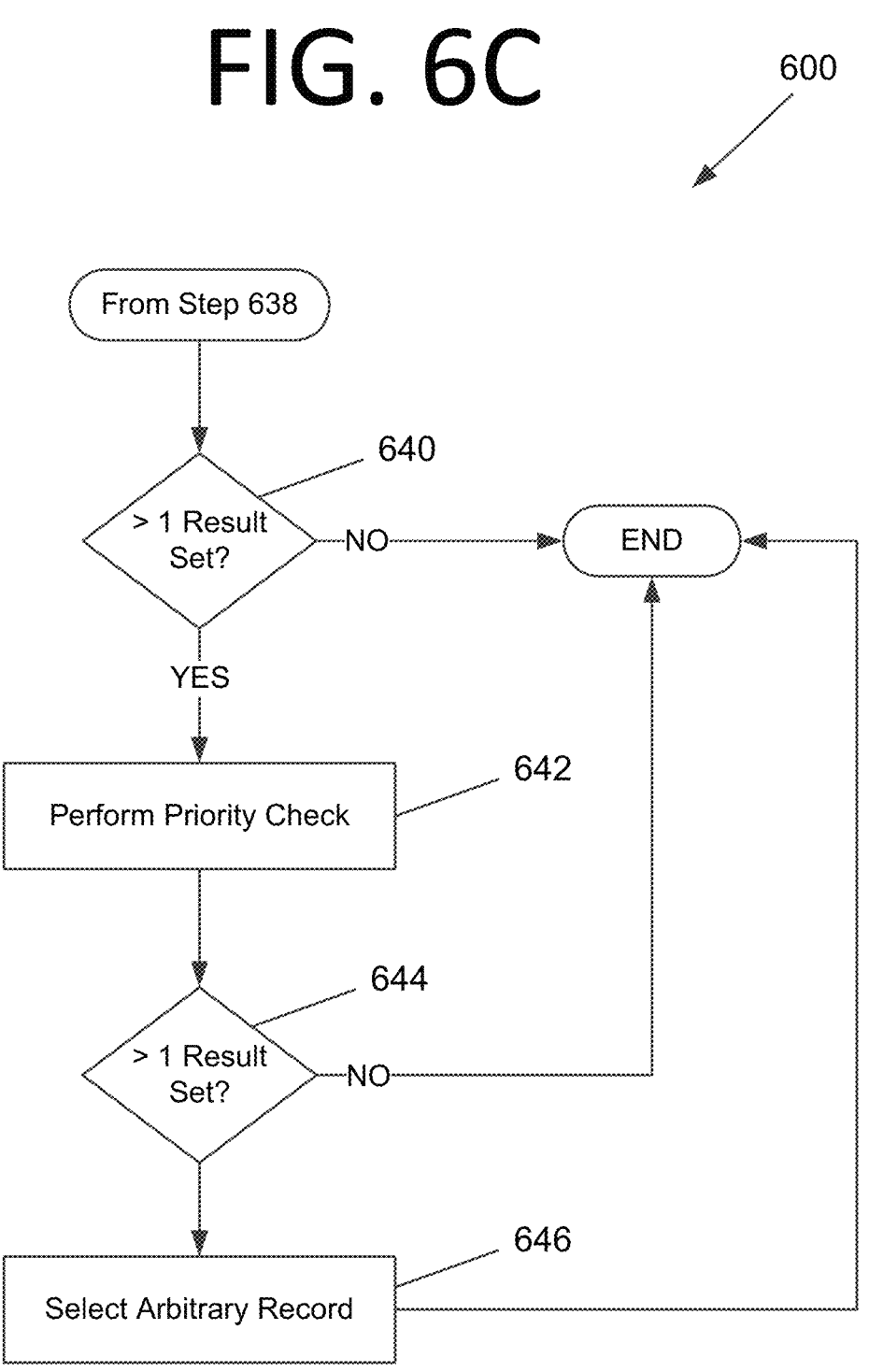

FIGS. 6A-C are a flowchart illustrating a rules engine service process 600, according to an embodiment of the present invention. In some embodiments, rules engine service process 600 may be rules engine service process 454 of FIGS. 4A and 4C, and/or process 500 of FIGS. 5A and 5B. An example JSON rules engine request is provided below.

```
{
    "requestedServices": "VOICE+DATA",
    "zipCode": "22314",
    "byod": "false"
    "deviceMake": "SEA",
    "salesChannel": "Store",
    "economicArea": "Alexandria, VA",
    "deviceCompatibleNetworks": [
        "ATT",
        "TMO",
        "DISH"
    ],
    "simCompatibleNetworks": [
        "UNKNOWN"
    ],
    "provisioningNetworks": [
        {
            "supportedServices": "DATA",
            "network": "DISH"
        },
        {
            "supportedServices": "VOICE+DATA",
            "network": "ATT"
        },
        {
            "supportedServices": "VOICE+DATA",
            "network": "TMO"
        }
    ],
    "customerId": "12345678912",
    "deviceModel": "SM-S908U",
    "networkToggles": {
        "att": "ON",
        "dish": "ON",
        "tmo": "ON"
    },
    "deviceCapabilities": "DSDS"
}
```

The process begins with restricting the rules to allowable networks passed from retail and available networks at 602. This is the domain of networks that should be considered. The rules engine database is then filtered based on the customer ID at 604. An exact match is sought first. However, if there is no exact match, (exact match, no wild card), if there is no match, then a match may be performed with a wildcard (captured from input). The rules engine then filters on the device capabilities (e.g., DSDS, non-DSDS, or unknown), the economic area (e.g., a geographic area), and the requested services (e.g., data or data+voice) at 606. In some embodiments, this filtering can be applied in parallel.

Business logic is applied at 608 to filter the rules table for networks that support both the SIM type and device type. If the new UE is a port-in order at 610, the result set is compared with each network from the rules table with voice as an available service with port-in eligible networks from the DGS request at 612 based on a given phone number. If the new UE is not a port-in order at 610, or after comparing the result set with port-in eligible networks at 612, the result set (i.e., each network list from the rule table) is compared with an available network coverage list from the DGS at 614 to determine feasible networks. In other words, does a given network provide coverage in that area? This may involve performing a direct string comparison for the networks from the networks list with the available network coverage list. The string contains the comparison for the available services from the network coverage list with services from the rules table networks column.

If more than one network is not determined to be feasible at 616, the process proceeds to step 636. If more than one network is determined to be feasible at 616, however, the make and model of the device is used to select the preferred network at 618. If this does not yield more than one network at 620, the process proceeds to step 636. If it does, however, BYOD filtering is performed at step 622. Depending on the various combinations of IMEI being present or not present and the value of the device model, BYOD logic is implemented to determine the network. If there is not more than one network at 624, the process proceeds to step 636.

If there is more than one network at 624, zip code filtering is performed at 626. The customer ID and zip code for the subscriber is used. If a preferred network is found for the customer ID and zip code, this preferred network is present in the remaining filtered results from the rules table, and there is not more than one network, the process proceeds to step 636. If not, and canary toggle is not on at 630, the process also proceeds to step 636.

If the canary toggle is on at step 630, canary logic is applied at 632. An example JSON canary removal percentage configuration file is provided below.

```
{
    "DISH": {
        "SEQUENCE": "1",
        "CANARY_PERCENTAGE": "80"
    },
    "TMO": {
        "SEQUENCE": "2",
        "CANARY_PERCENTAGE": "80"
    },
    "ATT": {
        "SEQUENCE": "3",
        "CANARY_PERCENTAGE": "0"
    }
}
```

A table of example attributes considered by the canary logic is provided below.

TABLE 3

| DATA ATTRIBUTES CONSIDERED IN CANARY LOGIC | | |
|---|---|---|
| Step No. | Name | Details |
| 1 | Rules Result Set | Output from step 505 |
| 2 | Canary Removal Percentage (A) | Updated by business |
| 3 | Network Presence Count (B) | Updated by rules engine with each request |
| 4 | Network Removal Count (C) | Updated by rules engine if removal happens |
| 5 | Network Removal Percentage (D) | Updated by rules engine for each request |
| 6 | Canary Toggle | On or off, updated by business |

The network removal percentage D is calculated by:

$$D = \left(\frac{C}{B}\right) * 100$$

If A>D, records that contain the network are removed from the rules result set, but not if A≤D.

If at least two distinct networks result from the canary logic at 634, the process returns to step 632, and A and C are retrieved from the table (e.g., Table 2) for each distinct network, considering the order by sequence. For each network that was returned, if D<A, the records that contain the network are removed from the rules result set and B, C, and D are updated. Otherwise, B is updated. For each network and request, A, B, C, and D are persisted in the database table. If the canary toggle is set to "off", B, C, and D are reset to 0. The database may automatically update the network removal percentage in some embodiments.

This process is repeated until only one network remains at step 634. If there is not more than one result set at 636, the process ends. Otherwise, the process proceeds to finding the records that have the least number of wild cards at 638. If there is only one result set at 640, the process also ends. However, if there is more than one result set at 640, a priority check is performed at 642 to check whether there is a single result set with a highest priority.

If there is not more than one result set at 644, the process ends. Otherwise, an arbitrary record (i.e., any remaining record) is selected from the results at 646 and the process ends. An example JSON rules engine response is provided below.

```
{
    "solution": "singleSIM",
    "orderDestination": "DISH",
    provisioningNetworks": [
        "simType": "ANY",
        "supportedServices": "VOICE+DATA",
        "network": "DISH"
    ]
}
```

Figure 7:
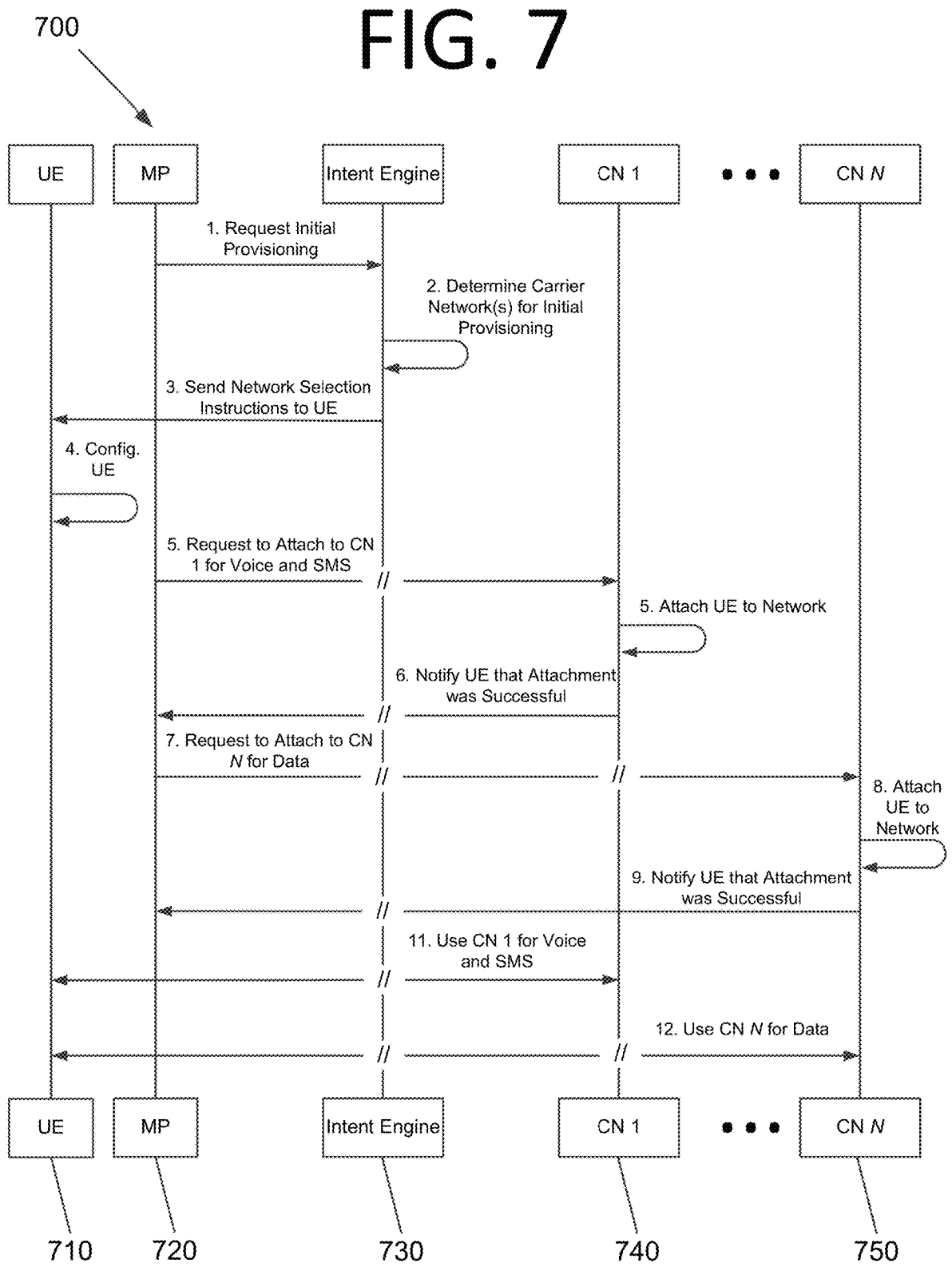
FIG. 7 is a flow diagram illustrating a process for initially provisioning UE, according to an embodiment of the present invention.

FIG. 7 is a flow diagram illustrating a process 700 for initially provisioning UE 710, according to an embodiment of the present invention. A management platform 720 requests initial SIM provisioning at order time (e.g., via an intent service request such as intent service request 440) from an intent engine 720 (e.g., intent service 450) for the brand of UE 710. Order management platform 720 is in the Business Support System (BSS) or Operation Support System (OSS) and may be operated by an MNO, for example.

Intent engine 730 may be hosted by or for an MNO or an MVNO (e.g., as part of a cloud computing solution). In some embodiments, management platform 720 may send certain information to intent engine 730, such as the user or retailer address, device details for UE 710 (e.g., supported bands, the detected signal strength of CN1 740 to CN N 750), SIM details, etc.

Intent engine 730 then uses this information, if provided, along with other information used by that provider for intelligent initial provisioning. Network(s) are then selected to provide services for UE 710 based on criteria such as the home location of UE 710, the hardware and software capabilities of UE 710, phone number eligibility, the average signal strength of the MNO networks in the area, the typical congestion on the MNO networks, the number or percentage of subscribers of the initial provisioning entity that are on the MNO networks, cost criteria, subscription criteria, MNO contract criteria, policy criteria (e.g., brand prioritization, preferring networks with certain capabilities, etc.), highest service quality, lowest voice and SMS service cost, forecasts of future traffic on MNO networks, canary factors, input from AI/ML models, and/or any other suitable criteria without deviating from the scope of the invention. This may be accomplished using a process similar to that of FIGS. 4A-C, 5A and 5B, and/or 6A-C in some embodiments.

In some embodiments, the criteria may be weighted to make certain criteria have a stronger or weaker effect on the initial provisioning. For instance, a scoring system may be produced where the criteria have weights, and the MNO network with the highest score may be selected as the home network. In certain embodiments, "override" functionality may be provided. For instance, if more subscribers are needed to meet contractual obligations with an MNO, if more subscribers are needed in a certain MNO network to maintain the desired percentages per canary factors, if the MNO network that would be selected is too congested or otherwise has degraded performance (e.g., by establishing threshold based on maximum tolerated congestion or a minimum acceptable signal strength), etc., the home network may be initially provisioned on this basis. For example, intent rules may establish a strict priority for networks A, B, and C, where network A is preferred, then B, then C. However, given a certain customer, economic area, sales channel, etc., these priorities can be overridden in a certain percentage of cases.

Based on the results of the initial provisioning process, intent engine 730 then instructs UE 710 which MNO network(s) will be the home network for which services. For instance, one MNO may be assigned as the home network for voice and SMS and another MNO may be assigned as the home network for data. UE 710 configures itself based on the network selection(s) by intent engine 730. For example, UE 710 may configure itself to use certain bands, configure the band priority order, configure the patent size, configure for 3CA, enable VoNR, enable VoLTE, etc.

In the example of FIG. 7, UE 710 has been instructed by intent engine 730 to use CN 1 740 as the home network for voice and SMS and to use CN N 750 as the home network for data. UE 710 sends requests to CN 1 740 and CN N 750 to attach to these networks for voice and SMS and for data, respectively. CN 1 740 and CN N 750 then attach UE 710 to their networks for these services and notify UE 710 that the network attachments were successful. UE 710 then uses CN 1 740 for voice and SMS services and uses CN N 750 for data services.

FIG. 8 is a flowchart illustrating a process 800 for performing intelligent initial provisioning for UE, according to an embodiment of the present invention. The process begins with training and deploying one or more AI/ML models at 810. The AI/ML model(s) may be trained in some embodiments using signal strength data, location data, congestion data, contractual data for one or more contracts between an entity performing the intelligent initial provisioning and one or more mobile network operators (MNOs), or any combination thereof.

An intelligent initial provisioning request is received from a management platform at 820. The initial provisioning request includes hardware and software capabilities of the UE. Intelligent initial provisioning is then performed for the UE at 830 to determine a home network section for the UE by analyzing intelligent initial provisioning criteria and incorporating the hardware and software capabilities of the UE. The intelligent initial provisioning criteria include a home location of the UE and hardware and software capabilities of the UE. In some embodiments, the intelligent initial provisioning criteria further include phone number eligibility for MNOs, average signal strengths of the MNO networks in the home location of the UE, average congestion over time on the MNO networks, a number or percentage of subscribers of an entity performing the intelligent initial provisioning that are on each of the MNO networks, cost criteria, subscription criteria, contract criteria between the entity performing the intelligent initial provisioning and the MNOs, policy criteria, a highest service quality among the MNOs, a lowest voice and SMS service cost among the MNOs, forecasts of future traffic on the MNO networks, canary factors, input from AI/ML models, or any combination thereof. In certain embodiments, the intelligent initial provisioning criteria are weighted and the intelligent initial provisioning includes applying a scoring system to the weighted intelligent initial provisioning criteria for each MNO network in the home location of the UE.

In some embodiments, the intelligent initial provisioning request is an intent service request and the intelligent initial provisioning includes executing an intent service including a data gathering service and a rules engine service and outputting the home network selection. In certain embodiments, the intent service request comprises an address, UE device details, and SIM details. In some embodiments, the data gathering service returns an economic area, a UE device capability, and a network coverage list, and the rules engine service returns the home network selection.

In some embodiments, the home network selection from the intelligent initial provisioning is overridden at 840 based on override criteria. In some embodiments, the override criteria include a number or percentage of subscribers required to meet contractual obligations with an MNO, a number or percentage of subscribers required in an MNO network based on canary factors, or an MNO falling below a network performance threshold based on maximum tolerated congestion or a minimum acceptable signal strength. The home network selection(s) are then sent from the intelligent initial provisioning to the UE at 850. In some embodiments, the home network selection includes a home network for voice and SMS services and another home network for data services. In certain embodiments, the home network selection includes whether to provision onto the home network(s) directly or through a third party.

Figure 9A:
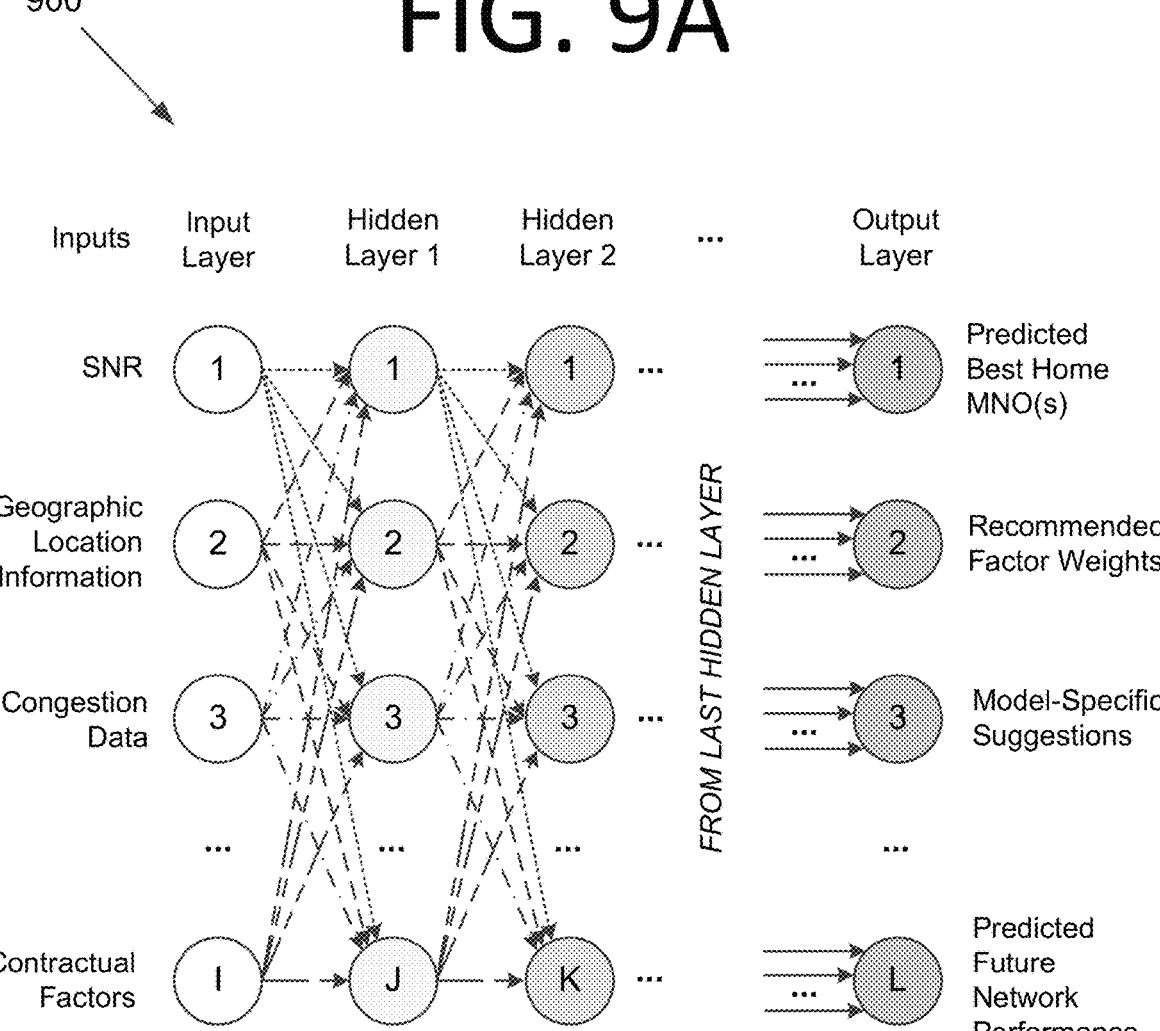
FIG. 9A illustrates an example of a neural network that has been trained to assist in an intelligent initial provisioning process, according to an embodiment of the present invention.

Per the above, AI/ML may be used to improve the intelligent network provisioning process in some embodiments. Various types of AI/ML models may be trained and deployed without deviating from the scope of the invention. For instance, FIG. 9A illustrates an example of a neural network 900 that has been trained to improve an intelligent initial provisioning process, according to an embodiment of the present invention.

Neural network 900 also includes a number of hidden layers. Both DLNNs and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 900.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 9A, SNR over time, geographic location information (e.g., home address, zip, currently available MNOs in area, etc.), congestion data over time, contractual factors, etc. provided as the input layer are fed as inputs to the J neurons of hidden layer 1. While all of these inputs are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. In this example, the outputs may be predicted best home MNO(s), recommended factor weights, model-specific suggestions, predicted future network performance, etc. It should be noted that numbers of neurons I, J, K, and L are not necessarily equal, and thus, any desired number of layers may be used for a given layer of neural network 900 without deviating from the scope of the invention. Indeed, in certain embodiments, the types of neurons in a given layer may not all be the same.

Neural network 900 is trained to assign a confidence score to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored. In this case, the outputs are the predicted best MNO for initial provisioning, recommended initial provisioning factor weight changes, UE model-specific suggestions (e.g., observing performance for a UE model in different MNOs over time at a location and modifying the suggested initial provisioning MNO accordingly), predicted future network performance characteristics, etc.

It should be noted that neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative ∞ and positive ∞, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 9B:
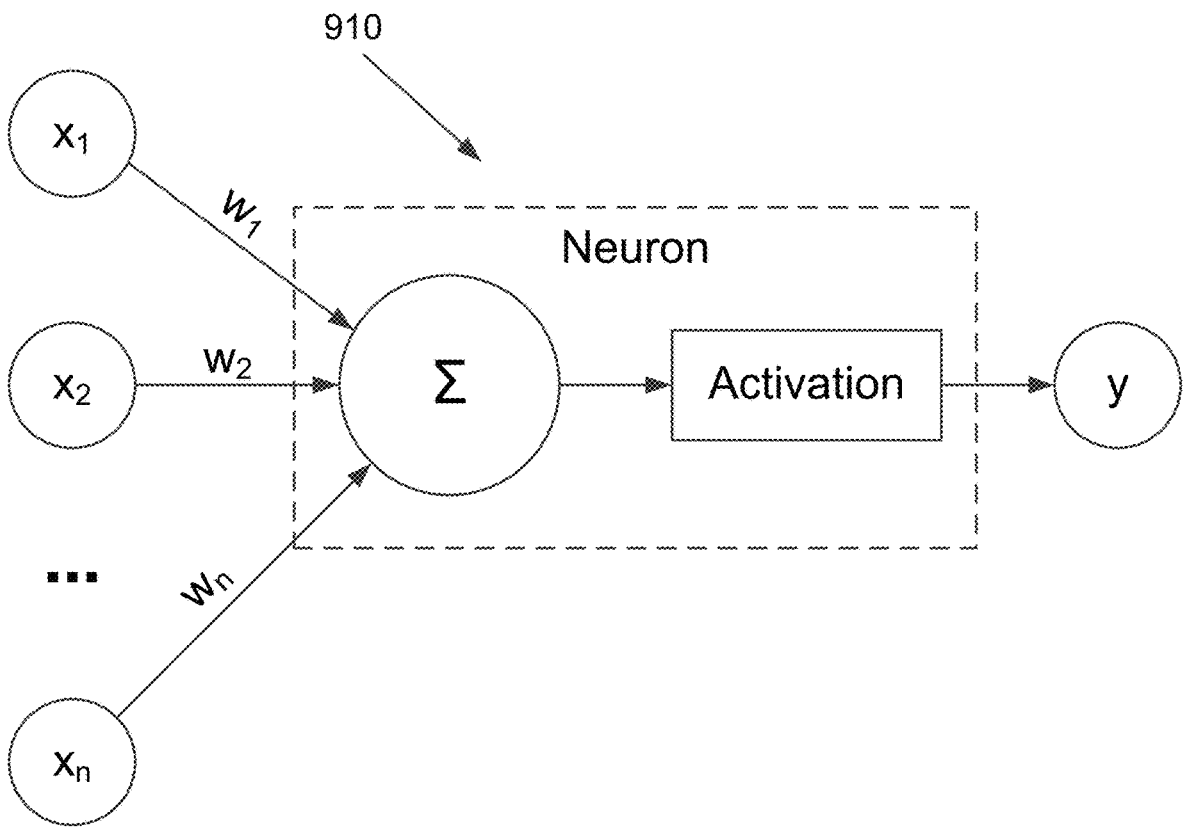
FIG. 9B illustrates an example of a neuron, according to an embodiment of the present invention.

An example of a neuron 910 is shown in FIG. 9B. Inputs $x_1, x_2, \ldots, x_n$ from a preceding layer are assigned respective weights $w_1, w_2, \ldots, w_n$. Thus, the collective input from preceding neuron 1 is $w_1 x_1$. These weighted inputs are used for the neuron's summation function modified by a bias, such as:

$$\sum_{i=1}^{m} (w_i x_i) + \text{bias} \qquad (1)$$

This summation is compared against an activation function $f(x)$ to determine whether the neuron "fires". For instance, $f(x)$ may be given by:

$$f(x) = \begin{cases} 1 \text{ if } \sum wx + \text{bias} \geq 0 \\ 0 \text{ if } \sum wx + \text{bias} < 0 \end{cases} \qquad (2)$$

The output y of neuron 910 may thus be given by:

$$y = f(x) \sum_{i=1}^{m} (w_i x_i) + \text{bias} \qquad (3)$$

In this case, neuron 910 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

The goal, or "reward function" is often employed, such as for this case the successful identification of graphical elements in the image. A reward function explores intermediate transitions and steps with both short-term and long-term rewards to guide the search of a state space and attempt to achieve a goal (e.g., finding the best or most suitable MNO network for a give service, determining when the network is likely to be congested, etc.).

During training, various labeled data is fed through neural network 900. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer $i=1, \ldots, N$ of the network, with the output at a given layer first multiplied by a synaptic matrix $W_i$, and with a bias vector bi added. The network output o, given by $$o = f_N(W_N f_{N-1}(W_{N-1} f_{N-2}( \ldots f_1(W_1 x + b_1) \ldots ) + b_{N-1}) + b_N) \qquad (4)$$

In some embodiments, o is compared with a target output t, resulting in an error $$E = \frac{1}{2} \|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j)=f'_j$ (n), where $n_j$ is the network activity at layer j (i.e., $n_j = W_j o_{j-1}+b_j$) where $o_j=f_j(n_j)$ and the apostrophe ' denotes the derivative of the activity function $f$.

The weight updates may be computed via the formulae:

$$d_j = \begin{cases} (o-t) \circ p_j(n_j), & j = N \\ W_{j+1}^T d_{j+1} \circ p_j(n_j), & j < N \end{cases} \quad (5)$$

$$\frac{\partial E}{\partial W_{j+1}} = d_{j+1}(o_j)^T \quad (6)$$

$$\frac{\partial E}{\partial b_{j+1}} = d_{j+1} \quad (7)$$

$$W_j^{new} = W_j^{old} - \eta \frac{\partial E}{\partial W_j} \quad (8)$$

$$b_j^{new} = b_j^{old} - \eta \frac{\partial E}{\partial b_j} \quad (9)$$

where $\circ$ denotes a Hadamard product (i.e., the element-wise product of two vectors), $^T$ denotes the matrix transpose, and $o_j$ denotes $f_j(W_j o_{j-1}+b_j)$, with $o_0$=x. Here, the learning rate $\eta$ is chosen with respect to machine learning considerations. Below, $\eta$ is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data, but does not generalize well to other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. This may collectively allow the AI/ML models to enable semantic understanding to better predict event-based congestion or service interruptions due to an accident, for instance.

Some embodiments may use transformer networks such as SentenceTransformers™, which is a Python™ framework for state-of-the-art sentence, text, and image embeddings.

Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Natural language processing (NLP) techniques such as word2vec, BERT, GPT-3, etc. may be used in some embodiments to facilitate semantic understanding. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

Figure 10:
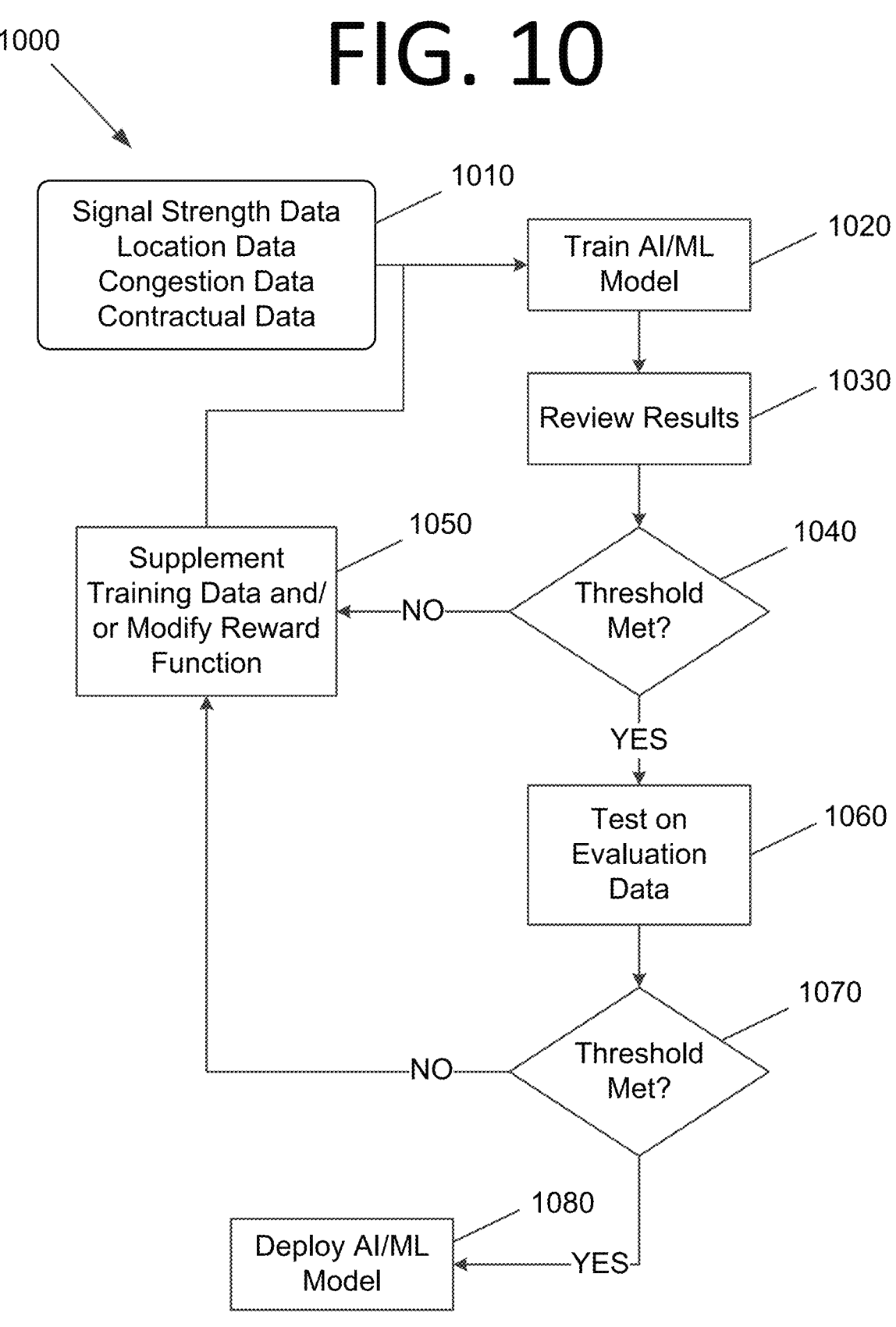
FIG. 10 is a flowchart illustrating a process for training AI/ML model(s), according to an embodiment of the present invention.

FIG. 10 is a flowchart illustrating a process 1000 for training AI/ML model(s), according to an embodiment of the present invention. The process begins with providing training data, such as signal strength data, location data, congestion data, contractual data, etc. at 1010, whether labeled or unlabeled. The nature of the training data that is provided will depend on the objective that the AI/ML model is intended to achieve. The AI/ML model is then trained over multiple epochs at 1020 and results are reviewed at 1030.

If the AI/ML model fails to meet a desired confidence threshold at 1040, the training data is supplemented and/or the reward function is modified to help the AI/ML model achieve its objectives better at 1050 and the process returns to step 1020. If the AI/ML model meets the confidence threshold at 1040, the AI/ML model is tested on evaluation data at 1060 to ensure that the AI/ML model generalizes well and that the AI/ML model is not over fit with respect to the training data. The evaluation data includes information that the AI/ML model has not processed before. If the confidence threshold is met at 1070 for the evaluation data, the AI/ML model is deployed at 1080. If not, the process returns to step 1050 and the AI/ML model is trained further.

Figure 11:
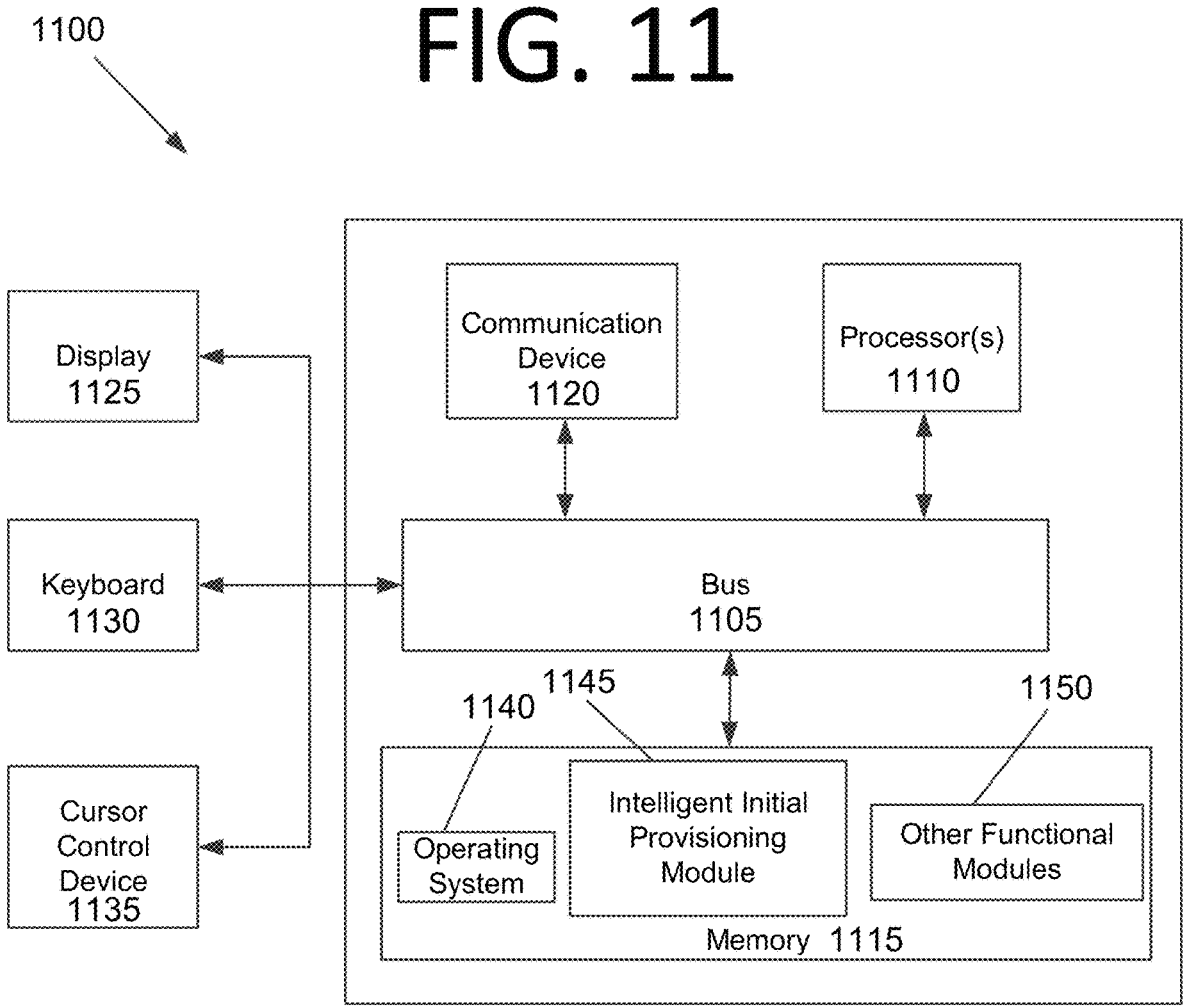
FIG. 11 is an architectural diagram illustrating a computing system configured to perform intelligent initial provisioning, according to an embodiment of the present invention.

FIG. 11 is an architectural diagram illustrating a computing system 1100 configured to perform intelligent network provisioning and/or aspects thereof, according to an embodiment of the present invention. In some embodiments, computing system 1100 may be one or more of the computing systems depicted and/or described herein, such as UE, a carrier server (e.g., that of an MNO or an MVNO), etc. Computing system 1100 includes a bus 1105 or other communication mechanism for communicating information, and processor(s) 1110 coupled to bus 1105 for processing information. Processor(s) 1110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1110 may also have multiple processing cores, and at least some of the cores may be configured to perform specific functions. Multi-parallel processing may be used in some embodiments. In certain embodiments, at least one of processor(s) 1110 may be a neuromorphic circuit that includes processing elements that mimic biological neurons. In some embodiments, neuromorphic circuits may not require the typical components of a Von Neumann computing architecture.

Computing system 1100 further includes a memory 1115 for storing information and instructions to be executed by processor(s) 1110. Memory 1115 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1110 and may include volatile media, non-volatile media, or both. The media may also be removable, non-removable, or both.

Additionally, computing system 1100 includes a communication device 1120, such as a transceiver, to provide access to a communications network via a wireless and/or wired connection. In some embodiments, communication device 1120 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 1120 may include one or more antennas that are singular, arrayed, phased, switched, beamforming, beamsteering, a combination thereof, and or any other antenna configuration without deviating from the scope of the invention.

Processor(s) 1110 are further coupled via bus 1105 to a display 1125, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1125 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 1130 and a cursor control device 1135, such as a computer mouse, a touchpad, etc., are further coupled to bus 1105 to enable a user to interface with computing system 1100. However, in certain embodiments, a physical keyboard and mouse may not be present, and the user may interact with the device solely through display 1125 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1115 stores software modules that provide functionality when executed by processor(s) 1110. The modules include an operating system 1140 for computing system 1100. The modules further include an intelligent initial provisioning module 1145 that is configured to perform all or part of the processes described herein or derivatives thereof. Computing system 1100 may include one or more additional functional modules 1150 that include additional functionality.

One skilled in the art will appreciate that a "computing system" could be embodied as a server, an embedded computing system, a personal computer, a console, a personal digital assistant (PDA), a cell phone, a tablet computing device, a smart watch, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 3-8 and 10 may be performed by computer program(s), encoding instructions for the processor(s) to perform at least part of the process(es) described in FIGS. 3-8 and 10, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 1110 of computing system 1100 of FIG. 11) to implement all or part of the process steps described in FIGS. 3-8 and 10, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. One or more non-transitory computer-readable media storing one or more computer programs, the one or more computer programs configured to cause at least one processor to:

perform intelligent initial provisioning for User Equipment (UE) to select a home network for the UE by analyzing intelligent initial provisioning criteria; and send the home network selection from the intelligent initial provisioning to the UE, wherein the intelligent initial provisioning criteria comprise a home location of the UE and hardware and software capabilities of the UE, and the home network selection comprises whether to provision onto the home network directly or through a third party.

2. The one or more non-transitory computer-readable media of claim 1, wherein the one or more computer programs are further configured to cause the at least one processor to:

receive an intelligent initial provisioning request from a management platform, the initial provisioning request comprising the hardware and software capabilities of the UE; and use the received intelligent initial provisioning request from the management platform in the intelligent initial provisioning.

3. The one or more non-transitory computer-readable media of claim 2, wherein the intelligent initial provisioning request is an intent service request and the intelligent initial provisioning comprises:

executing an intent service comprising a data gathering service and a rules engine service; and outputting the home network selection.

4. The one or more non-transitory computer-readable media of claim 3, wherein the intent service request comprises an address, UE device details, and Subscriber Identity Module (SIM) details.

5. The one or more non-transitory computer-readable media of claim 3, wherein the data gathering service returns an economic area, a UE device capability, and a network coverage list, and the rules engine service returns the home network selection.

6. The one or more non-transitory computer-readable medium of claim 1, wherein the intelligent initial provisioning criteria further comprise phone number eligibility for Mobile Network Operators (MNOs), average signal strengths of the MNO networks in the home location of the UE, average congestion over time on the MNO networks, a number or percentage of subscribers of an entity performing the intelligent initial provisioning that are on each of the MNO networks, cost criteria, subscription criteria, contract criteria between the entity performing the intelligent initial provisioning and the MNOs, policy criteria, a highest service quality among the MNOs, a lowest voice and Short Message Service (SMS) service cost among the MNOs, forecasts of future traffic on the MNO networks, canary factors, input from artificial intelligence (AI)/machine learning (ML) models, or any combination thereof.

7. The one or more non-transitory computer-readable media of claim 1, wherein
  the intelligent initial provisioning criteria are weighted, and
  the intelligent initial provisioning comprises applying a scoring system to the weighted intelligent initial provisioning criteria for each MNO network in the home location of the UE.

8. The one or more non-transitory computer-readable media of claim 7, wherein the one or more computer programs are further configured to cause the at least one processor to:
  override the home network selection from the intelligent initial provisioning based on override criteria.

9. The one or more non-transitory computer-readable media of claim 8, wherein the override criteria comprise a number or percentage of subscribers required to meet contractual obligations with a Mobile Network Operator (MNO), a number or percentage of subscribers required in an MNO network based on canary factors, or an MNO falling below a network performance threshold based on maximum tolerated congestion or a minimum acceptable signal strength.

10. The one or more non-transitory computer-readable media of claim 1, wherein the home network selection comprises a home network for voice and Short Message Service (SMS) services and another home network for data services.

11. The one or more non-transitory computer-readable media of claim 1, wherein the one or more computer programs are further configured to cause the at least one processor to:
  train one or more artificial intelligence (AI)/machine learning (ML) models using signal strength data, location data, congestion data, contractual data for one or more contracts between an entity performing the intelligent initial provisioning and one or more Mobile Network Operators (MNOs), or any combination thereof;
  deploy the one or more trained AI/ML models; and
  use the one or more AI/ML models as part of the intelligent initial provisioning.

12. A computer-implemented method, comprising:
  receiving an intelligent initial provisioning request from a management platform, by one or more computing systems, the initial provisioning request comprising hardware and software capabilities of User Equipment (UE);
  performing intelligent initial provisioning for the UE to select a home network for the UE by analyzing intelligent initial provisioning criteria using the received intelligent initial provisioning request from the UE, by the one or more computing systems; and
  sending the home network selection from the intelligent initial provisioning to the UE, by the one or more computing systems, wherein the intelligent initial provisioning criteria comprise a home location of the UE and hardware and software capabilities of the UE, and
  the home network selection comprises whether to provision onto the home network directly or through a third party.

13. The computer-implemented method of claim 12, wherein the intelligent initial provisioning request is an intent service request and the intelligent initial provisioning comprises:
  executing an intent service comprising a data gathering service and a rules engine service; and
  outputting the home network selection.

14. The computer-implemented method of claim 13, wherein the intent service request comprises an address, UE device details, and Subscriber Identity Module (SIM) details.

15. The computer-implemented method of claim 13, wherein the data gathering service returns an economic area, a UE device capability, and a network coverage list, and the rules engine service returns the home network selection.

16. The computer-implemented method of claim 12, wherein the intelligent initial provisioning criteria further comprise phone number eligibility for Mobile Network Operators (MNOs), average signal strengths of the MNO networks in the home location of the UE, average congestion over time on the MNO networks, a number or percentage of subscribers of an entity performing the intelligent initial provisioning that are on each of the MNO networks, cost criteria, subscription criteria, contract criteria between the entity performing the intelligent initial provisioning and the MNOs, policy criteria, a highest service quality among the MNOs, a lowest voice and Short Message Service (SMS) service cost among the MNOs, forecasts of future traffic on the MNO networks, canary factors, input from artificial intelligence (AI)/machine learning (ML) models, or any combination thereof.

17. The computer-implemented method of claim 12, further comprising:
  overriding the home network selection from the intelligent initial provisioning, by the one or more computing systems, based on override criteria, wherein
  the override criteria comprise a number or percentage of subscribers required to meet contractual obligations with a Mobile Network Operator (MNO), a number or percentage of subscribers required in an MNO network based on canary factors, or an MNO falling below a network performance threshold based on maximum tolerated congestion or a minimum acceptable signal strength.

18. The computer-implemented method of claim 12, further comprising:
  training one or more artificial intelligence (AI)/machine learning (ML) models, by the one or more computing systems, using signal strength data, location data, congestion data, contractual data for one or more contracts between an entity performing the intelligent initial provisioning and one or more Mobile Network Operators (MNOs), or any combination thereof;
  deploying the one or more trained AI/ML models, by the one or more computing systems; and
  using the one or more AI/ML models as part of the intelligent initial provisioning, by the one or more computing systems.

19. One or more computing systems, comprising:

memory storing computer program instructions; and at least one processor configured to execute the computer program instructions, wherein the computer program instructions are configured to cause at least one processor to:

receive an intelligent initial provisioning request from a management platform, the initial provisioning request comprising hardware and software capabilities of User Equipment (UE), perform intelligent initial provisioning for the UE to select a home network for the UE by analyzing intelligent initial provisioning criteria using the received intelligent initial provisioning request from the UE, and send the home network selection from the intelligent initial provisioning to the UE, wherein the intelligent initial provisioning criteria comprise a home location of the UE and hardware and software capabilities of the UE, the intelligent initial provisioning request is an intent service request, and the intelligent initial provisioning comprises executing an intent service comprising a data gathering service and a rules engine service.

20. The one or more computing systems of claim 19, wherein the intelligent initial provisioning criteria further comprise phone number eligibility for Mobile Network Operators (MNOs), average signal strengths of the MNO networks in the home location of the UE, average congestion over time on the MNO networks, a number or percentage of subscribers of an entity performing the intelligent initial provisioning that are on each of the MNO networks, cost criteria, subscription criteria, contract criteria between the entity performing the intelligent initial provisioning and the MNOs, policy criteria, a highest service quality among the MNOs, a lowest voice and Short Message Service (SMS) service cost among the MNOs, forecasts of future traffic on the MNO networks, canary factors, input from artificial intelligence (AI)/machine learning (ML) models, or any combination thereof.

\* \* \* \* \*